(12) United States Patent
Stump et al.

(10) Patent No.: US 11,899,432 B2
(45) Date of Patent: Feb. 13, 2024

(54) INDUSTRIAL AUTOMATION PROJECT LIBRARY CROSS SHARING

(71) Applicant: Rockwell Automation Technologies, Inc., Mayfield Heights, OH (US)

(72) Inventors: Andrew R. Stump, Mentor, OH (US); Anthony Carrara, Strongsville, OH (US); Adam Gregory, Oak Creek, WI (US); Lorenzo Majewski, Milwaukee, WI (US); Eashwer Srinivasan, Fremont, OH (US); Srdjan Josipovic, Beachwood, OH (US); Michael J Coan, Mayfield Heights, OH (US); Christopher Edward Stanek, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 259 days.

(21) Appl. No.: 17/406,498

(22) Filed: Aug. 19, 2021

(65) Prior Publication Data
US 2023/0058094 A1 Feb. 23, 2023

(51) Int. Cl.
G05B 19/418 (2006.01)

(52) U.S. Cl.
CPC ... *G05B 19/41835* (2013.01); *G05B 19/4185* (2013.01); *G05B 19/41845* (2013.01);
(Continued)

(58) Field of Classification Search
CPC ........ G05B 19/41835; G05B 19/41845; G05B 19/4185; G05B 2219/23258;
(Continued)

(56) References Cited

U.S. PATENT DOCUMENTS

| 6,094,654 A | 7/2000 | Van Huben et al. |
| 6,170,081 B1 | 1/2001 | Fontana et al. |

(Continued)

FOREIGN PATENT DOCUMENTS

| EP | 2 177 986 A1 | 4/2010 |
| EP | 3 246 827 A1 | 11/2017 |

(Continued)

OTHER PUBLICATIONS

Non Final Office Action received for U.S. Appl. No. 17/204,156 dated Jun. 29, 2022, 66 pages.
(Continued)

*Primary Examiner* — Kenneth M Lo
*Assistant Examiner* — Mohammed Shafayet
(74) *Attorney, Agent, or Firm* — Amin, Turocy & Watson, LLP

(57) ABSTRACT

An industrial integrated development environment (IDE) provides a development framework for designing, programming, and configuring multiple aspects of an industrial automation system using a common design environment and data model. Projects creating using embodiments of the IDE system can be built on an object-based model rather than, or in addition to, a tag-based architecture. To this end, the IDE system can support the use of automation objects that serve as building blocks for this object-based development structure. These automation objects represent corresponding physical industrial assets and have associated programmatic attributes relating to those assets. Automation objects can be maintained in shared libraries that can be referenced by system projects. The IDE system can notify projects that reference these automation objects of updates to the object libraries, including edits to existing objects or addition of new objects.

20 Claims, 20 Drawing Sheets

(52) U.S. Cl.
CPC .............. *G05B 2219/23258* (2013.01); *G05B 2219/23261* (2013.01); *G05B 2219/23424* (2013.01)

(58) Field of Classification Search
CPC ........... G05B 2219/23261; G05B 2219/23424; G05B 19/0426; G06F 8/34; G06F 8/71
See application file for complete search history.

(56) References Cited

U.S. PATENT DOCUMENTS

| | | | |
|---|---|---|---|
| 8,352,905 | B2 | 1/2013 | Chouinard et al. |
| 8,877,134 | B2 | 11/2014 | Awaji et al. |
| 8,887,134 | B2 | 11/2014 | Weatherhead et al. |
| 9,342,278 | B2 | 5/2016 | Petzoldt et al. |
| 10,275,265 | B1 | 4/2019 | Gould et al. |
| 10,372,107 | B2 | 8/2019 | Majewski et al. |
| 10,942,710 | B1 | 3/2021 | Dunn et al. |
| 10,943,692 | B1 | 3/2021 | Fynn et al. |
| 11,080,176 | B2 | 8/2021 | Stump et al. |
| 11,243,505 | B2 | 2/2022 | Strohmenger et al. |
| 11,294,360 | B2 | 4/2022 | Miller et al. |
| 11,314,493 | B1 | 4/2022 | Stump et al. |
| 11,429,351 | B2 | 8/2022 | Nayak et al. |
| 2003/0045950 | A1* | 3/2003 | Bronikowski ............ G06F 8/20 700/86 |
| 2006/0184571 | A1 | 8/2006 | Liu et al. |
| 2006/0259500 | A1* | 11/2006 | Hood .................. G05B 19/056 |
| 2008/0125877 | A1 | 5/2008 | Miller et al. |
| 2009/0083649 | A1 | 3/2009 | Baier et al. |
| 2009/0240348 | A1 | 9/2009 | Chand et al. |
| 2009/0293005 | A1 | 11/2009 | Hooyman |
| 2010/0050097 | A1 | 2/2010 | McGreevy et al. |
| 2010/0082133 | A1 | 4/2010 | Chouinard |
| 2013/0275908 | A1 | 10/2013 | Reichard |
| 2015/0287318 | A1 | 10/2015 | Nair et al. |
| 2015/0341469 | A1* | 11/2015 | Lawson ................ G06F 9/5072 709/203 |
| 2017/0192414 | A1 | 7/2017 | Mukkamala et al. |
| 2017/0323112 | A1 | 11/2017 | Tran et al. |
| 2019/0302735 | A1* | 10/2019 | Majewski .......... G05B 19/4097 |
| 2020/0012265 | A1* | 1/2020 | Thomsen .............. G06F 3/0481 |
| 2020/0103843 | A1 | 4/2020 | Stump et al. |
| 2020/0225821 | A1* | 7/2020 | Hammack .......... G05B 19/4188 |
| 2020/0319767 | A1 | 10/2020 | Hammack et al. |
| 2021/0089278 | A1 | 3/2021 | Dunn et al. |
| 2021/0096978 | A1 | 4/2021 | Stump et al. |
| 2021/0097216 | A1 | 4/2021 | Stump et al. |
| 2021/0141614 | A1 | 5/2021 | Dunn et al. |
| 2021/0294734 | A1 | 9/2021 | Stump et al. |

FOREIGN PATENT DOCUMENTS

| | | |
|---|---|---|
| EP | 3 640 793 A2 | 4/2020 |
| EP | 3 696 622 A1 | 8/2020 |

OTHER PUBLICATIONS

Hou et al, "An Empirical Analysis of the Evolution of User-Visible Features in an Integrated Development Environment", ACM, 2009, pp. 122-135.
Lorentz et al., "Next Generation Integrated Development of Automation Control Code in TORERO", IEEE, 2003, pp. 858-861.
Karsai et al, "Model-Integrated Development of Embedded Software", Proceedings of the IEEE, vol. 91, No. 1, Jan. 2003, pp. 145-164.
Extended European Search Report received for European Patent Application Serial No. 22156325.7 dated Jul. 15, 2022, 9 pages.
Extended European Search Report received for European Patent Application Serial No. 22162176.6 dated Aug. 9, 2022, 15 pages.
Estévez et al., "Automatic Generation of PLC Automation Projects from Component-Based Models", International Journal of Advanced Manufacturing Technology, vol. 35, 2007, pp. 527-540.
Non Final Office Action received for U.S. Appl. No. 17/197,258 dated Sep. 27, 2022, 91 pages.
Final Office Action received for U.S. Appl. No. 17/398,272 dated Feb. 17, 2023, 141 pages.
Notice of Allowance received for U.S. Appl. No. 17/701,853 dated Feb. 22, 2023, 56 pages.
Extended European Search Report received for European Patent Application Serial No. 22189178.1 dated Jan. 9, 2023, 8 pages.
Final Office Action received for U.S. Appl. No. 17/197,258 dated Feb. 21, 2023, 98 pages.
Chen et al., CN 104866426, "Comprehensive Control Method and System for Software Testing" (translation), Oct. 17, 2017, 13 pages.
Notice of Allowance received for U.S. Appl. No. 17/180,201 dated Dec. 27, 2021, 30 pages.
Kuhl et al., "A Middleware for Software Evolution of Automation Software", IEEE ETFA, 2011, 9 pages.
Extended European Search Report received for European Patent Application Serial No. 22160774.0 dated Jul. 22, 2022, 9 pages.
Communication pursuant to Article 94(3) EPC for European Patent Application Serial No. 21178010.1 dated Dec. 5, 2022, 5 pages.
Notice of Allowance received for U.S. Appl. No. 17/204,156 dated Oct. 27, 2022, 88 pages.
Lastra et al, "Semantic Extension for Automation Objects", IEEE, pp. 892-897 (Year: 2006).
Schroeder et al., "Comining Behavior and Data Modeling in Automated Test Case Generation", IEEE, pp. 1-8 (Year: 2003).
Zhou et al., "Schema Evolution of an Object-Oriented Real-Time Database System for Manufacturing Automation", IEEE, pp. 956-977 (Year: 1997).
Estevez et al., "Model Driven Design in Industrial Automation", IEEE, pp. 6262-6267 (Year: 2009).
Non Final Office Action received for U.S. Appl. No. 17/398,272 dated Nov. 1, 2022, 104 pages.
Communication pursuant to Rule 69 EPC for European Patent Application Serial No. 22156325.7 dated Aug. 29, 2022, 2 pages.
Non-Final Office Action received for U.S. Appl. No. 17/398,272 dated May 2, 2023, 147 pages.
Notice of Allowance received for U.S. Appl. No. 17/398,272 dated Aug. 8, 2023, 125 pages.

* cited by examiner

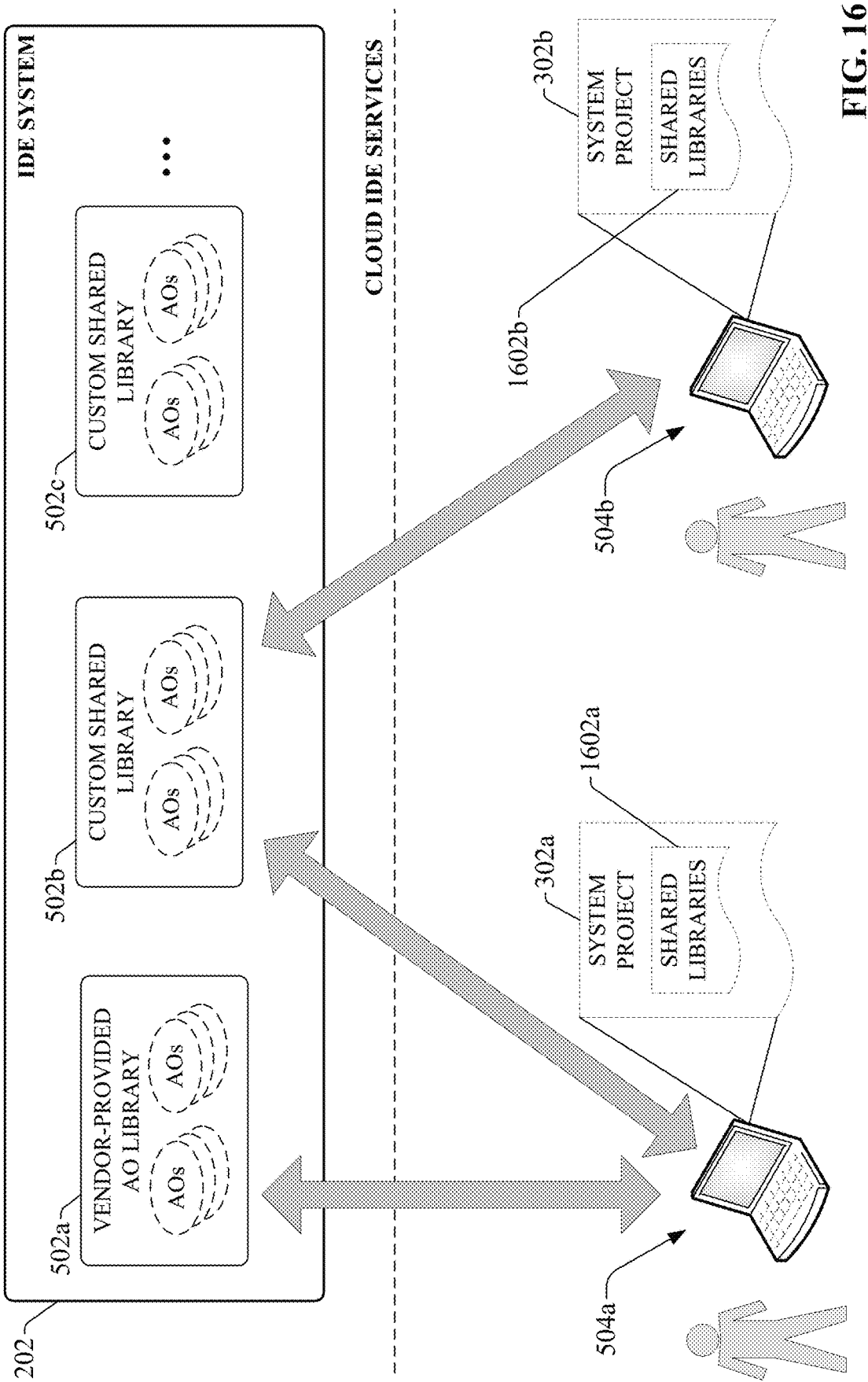

ly to industrial automation systems, and, for example, to industrial programming development platforms.

INDUSTRIAL AUTOMATION PROJECT LIBRARY CROSS SHARING

BACKGROUND

The subject matter disclosed herein relates generally to industrial automation systems, and, for example, to industrial programming development platforms.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for developing industrial applications is provided, comprising a memory that stores executable components and shared libraries of automation objects representing respective industrial assets, the automation objects having respective programmatic attributes associated with the industrial assets; a user interface component configured to render integrated development environment (IDE) interfaces and to receive, via interaction with the IDE interfaces, design input that defines aspects of an industrial automation project; and a project generation component configured to generate system project data based on the design input, the system project data comprising instances of one or more of the automation objects stored in one or more of the shared libraries to which the system project is mapped, wherein the system project data defines a system project comprising at least one of an executable industrial control program, an industrial visualization application, or industrial device configuration data, and the project generation component is configured to, in response to receipt of an edit to an automation object in one of the shared libraries: determine whether an instance of the automation object is included in the system project data, and cause the user interface component to render, via one or more of the IDE interfaces, a notification indicating that the automation object has been edited in the library.

Also, one or more embodiments provide a method for developing industrial applications, comprising rendering, by a system comprising a processor, integrated development environment (IDE) interfaces on a client device; receiving, by the system via interaction with the IDE interfaces, design input that defines aspects of an industrial control and monitoring project; generating, by the system, system project data based on the design input, the system project data comprising instances of one or more of the automation objects stored in one or more shared libraries of automation objects, wherein the generating comprises generating at least one of an executable industrial control program, an industrial visualization application, or industrial device configuration data; and in response to receipt of an edit to an automation object in a library of the shared libraries: determining, by the system, whether an instance of the automation object is included in the system project data, and rendering, by the system via one or more of the IDE interfaces, a notification indicating that the automation object has been edited in the library.

Also, according to one or more embodiments, a non-transitory computer-readable medium is provided having stored thereon instructions that, in response to execution, cause a system to perform operations, the operations comprising rendering integrated development environment (IDE) interfaces on a client device; receiving, from the client device via interaction with the IDE interfaces, design input that defines control design aspects of an industrial automation project; generating system project data based on the design input, wherein the generating comprises generating at least one of an executable industrial control program, an industrial visualization application, or industrial device configuration data, and the system project data comprises instances of automation objects selected from one or more shared libraries of automation objects, the automation objects representing respective industrial assets and having respective programmatic attributes relating to the industrial assets; and in response to receipt of an edit to an automation object in a library of the shared libraries: determining whether an instance of the automation object is included in the system project data, and rendering, via one or more of the IDE interfaces, a notification indicating that the automation object has been edited in the library.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 16 is a diagram illustrating cross-sharing of shared libraries.

DETAILED DESCRIPTION

Figure 1:
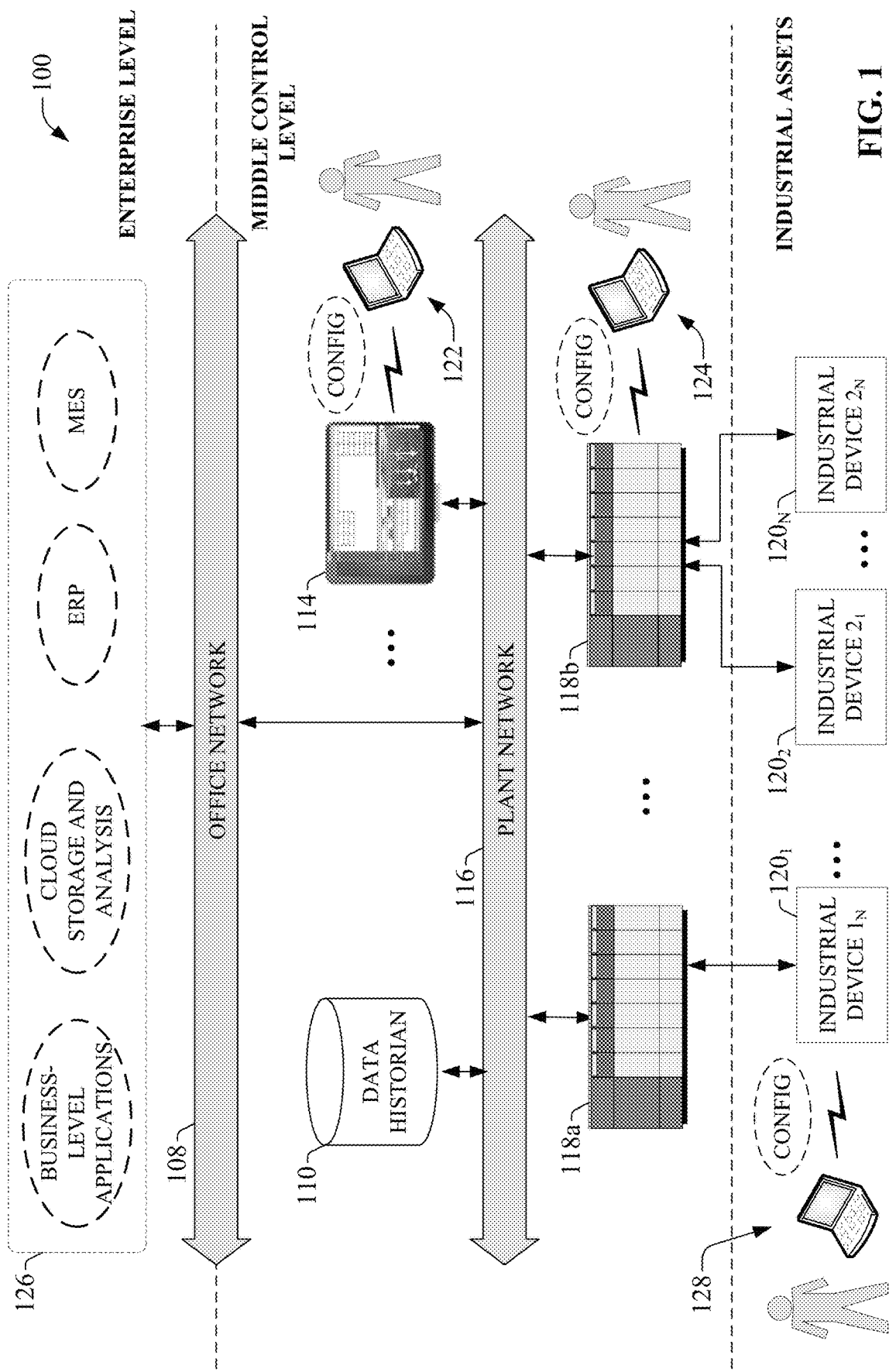
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledge-bases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using respective configuration applications specific to each device. For example, industrial controllers 118 are typically configured and programmed using a control programming development application such as a ladder logic editor (e.g., executing on a client device 124). Using such development platforms, a designer can write control programming (e.g., ladder logic, structured text, function block diagrams, etc.) for carrying out a desired industrial sequence or process and download the resulting program files to the controller 118. Separately, developers design visualization screens and associated navigation structures for HMIs 114 using an HMI development platform (e.g., executing on client device 122) and download the resulting visualization files to the HMI 114. Some industrial devices 120—such as motor drives, telemetry devices, safety input devices, etc.—may also require configuration using separate device configuration tools (e.g., executing on client device 128) that are specific to the device being configured. Such device configuration tools may be used to set device parameters or operating modes (e.g., high/low limits, output signal formats, scale factors, energy consumption modes, etc.).

The necessity of using separate configuration tools to program and configure disparate aspects of an industrial automation system results in a piecemeal design approach whereby different but related or overlapping aspects of an automation system are designed, configured, and programmed separately on different development environments. For example, a motion control system may require an industrial controller to be programmed and a control loop to be tuned using a control logic programming platform, a motor drive to be configured using another configuration platform, and an associated HMI to be programmed using a visualization development platform. Related peripheral systems—such as vision systems, safety systems, etc.—may also require configuration using separate programming or development applications.

This segregated development approach can also necessitate considerable testing and debugging efforts to ensure proper integration of the separately configured system aspects. In this regard, intended data interfacing or coordinated actions between the different system aspects may require significant debugging due to a failure to properly coordinate disparate programming efforts.

To address at least some of these or other issues, one or more embodiments described herein provide an integrated development environment (IDE) for designing, programming, and configuring multiple aspects of an industrial automation system using a common design environment and data model. Embodiments of the industrial IDE can be used to configure and manage automation system devices in a common way, facilitating integrated, multi-discipline programming of control, visualization, and other aspects of the control system.

In general, the industrial IDE supports features that span the full automation lifecycle, including design (e.g., device selection and sizing, controller programming, visualization development, device configuration, testing, etc.); installation, configuration and commissioning; operation, improvement, and administration; and troubleshooting, expanding, and upgrading.

Embodiments of the industrial IDE can include a library of modular code and visualizations that are specific to industry verticals and common industrial applications within those verticals. These code and visualization modules can simplify development and shorten the development cycle, while also supporting consistency and reuse across an industrial enterprise.

To support enhance development capabilities, projects creating using embodiments of the IDE system can be built on an object-based model rather than, or in addition to, a tag-based architecture. To this end, the IDE system can support the use of automation objects that serve as building blocks for this object-based development structure. To ensure consistency within and between projects, as well as to ensure that a given industrial project is dynamically updated to reflect changes to an industrial asset's attributes (e.g., control code, visualization definitions, testing scripts, analytic code, etc.), embodiments of the IDE system can use automation object inheritance features to propagate changes made to an automation object definition to all instances of the automation object used throughout a control project.

The IDE system can also support creation of multiple shared libraries of automation objects or other project components. This allows users to create one or more custom libraries of project components, which can be built from existing project components from other libraries or populated with new custom components. Projects can then reference one or more of these shared libraries so that components in those libraries can be selectively imported into those projects. Notification features can inform users whose projects reference a shared library when an object or component within that library has been updated by one of the users. Each user can then opt to either synchronize the object or component modification to their own project, or decline synchronization of the modification to their project.

Figure 2:
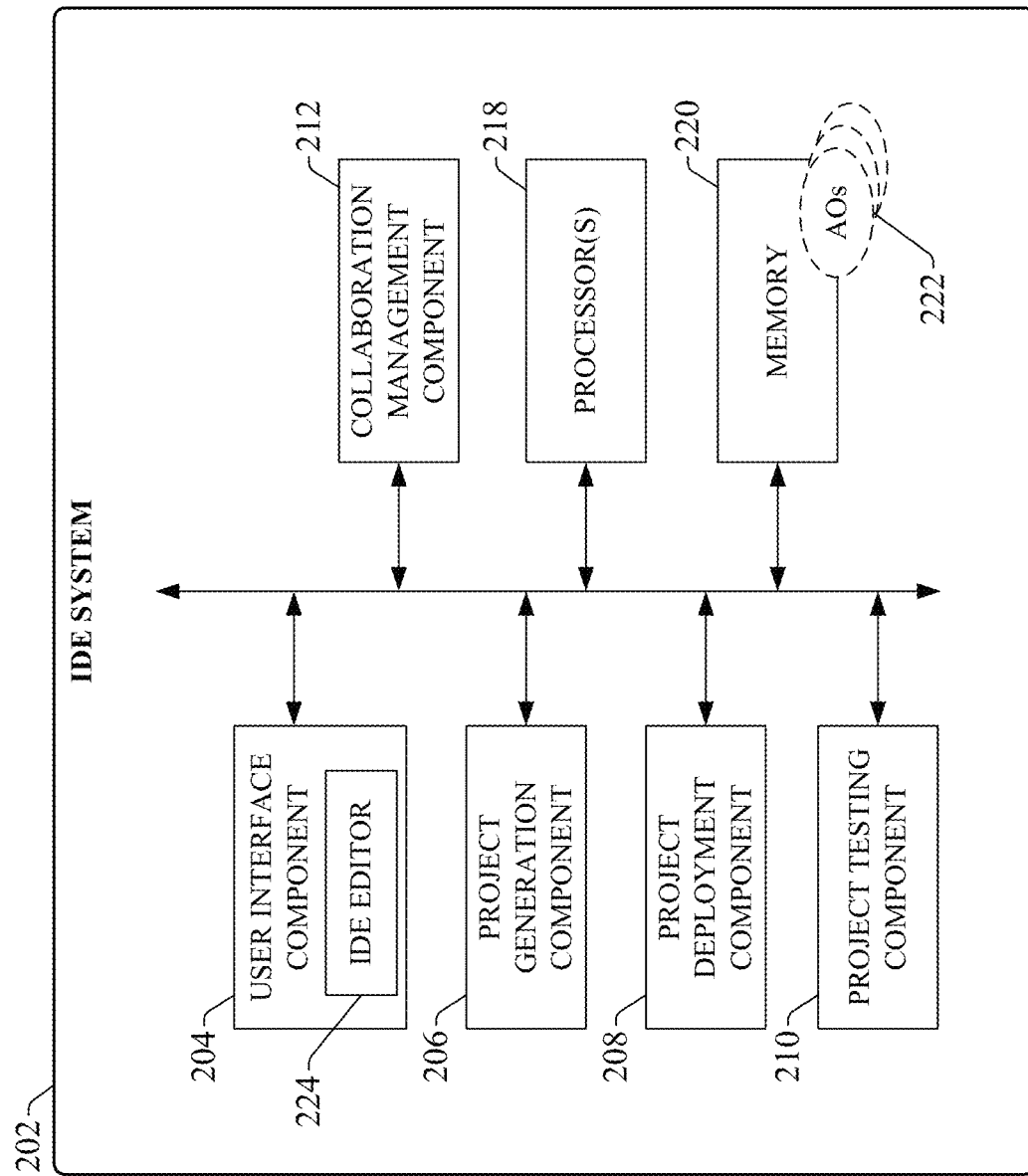
FIG. 2 is a block diagram of an example integrated development environment (IDE) system.

FIG. 2 is a block diagram of an example integrated development environment (IDE) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 202 can include a user interface component 204 including an IDE editor 224, a project generation component 206, a project deployment component 208, a project testing component 210, a collaboration management component 212, one or more processors 218, and memory 220. In various embodiments, one or more of the user interface component 204, project generation component 206, project deployment component 208, project testing component 210, collaboration management component 212, the one or more processors 218, and memory 220 can be electrically and/or communicatively coupled to one another to perform one or more of the functions of the IDE system 202. In some embodiments, components 204, 206, 208, 210, and 212 can comprise software instructions stored on memory 220 and executed by processor(s) 218. IDE system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with an IDE client that executes on a client device (e.g., a laptop computer, tablet computer, smart phone, etc.) that is communicatively connected to the IDE system 202 (e.g., via a hardwired or wireless connection). The user interface component 204 can then receive user input data and render output data via the IDE client. In other embodiments, user interface component 314 can be configured to generate and serve suitable interface screens to a client device (e.g., program development screens), and exchange data via these interface screens. Input data that can be received via various embodiments of user interface component 204 can include, but is not limited to, programming code, industrial design specifications or goals, engineering drawings, AR/VR input, DSL definitions, video or image data, project testing scripts, or other such input. Output data rendered by various embodiments of user interface component 204 can include program code, programming feedback (e.g., error and highlighting, coding suggestions, etc.), programming and visualization development screens, project testing results, etc.

Project generation component 206 can be configured to create a system project comprising one or more project files based on design input received via the user interface component 204, as well as industrial knowledge, predefined code modules and visualizations, and automation objects 222 maintained by the IDE system 202. Project deployment component 208 can be configured to commission the system project created by the project generation component 206 to appropriate industrial devices (e.g., controllers, HMI terminals, motor drives, AR/VR systems, etc.) for execution. To this end, project deployment component 208 can identify the appropriate target devices to which respective portions of the system project should be sent for execution, translate these respective portions to formats understandable by the target devices, and deploy the translated project components to their corresponding devices.

Project testing component 210 can be configured to execute testing scripts associated with automation objects 222 or other elements of the system project to validate proper execution of various aspects of the project. Collaboration management component 212 can be configured to track instances of a system project that have been downloaded to local client devices so that these local versions of the project can be updated as needed in response to modifications submitted to the cloud-based IDE system.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
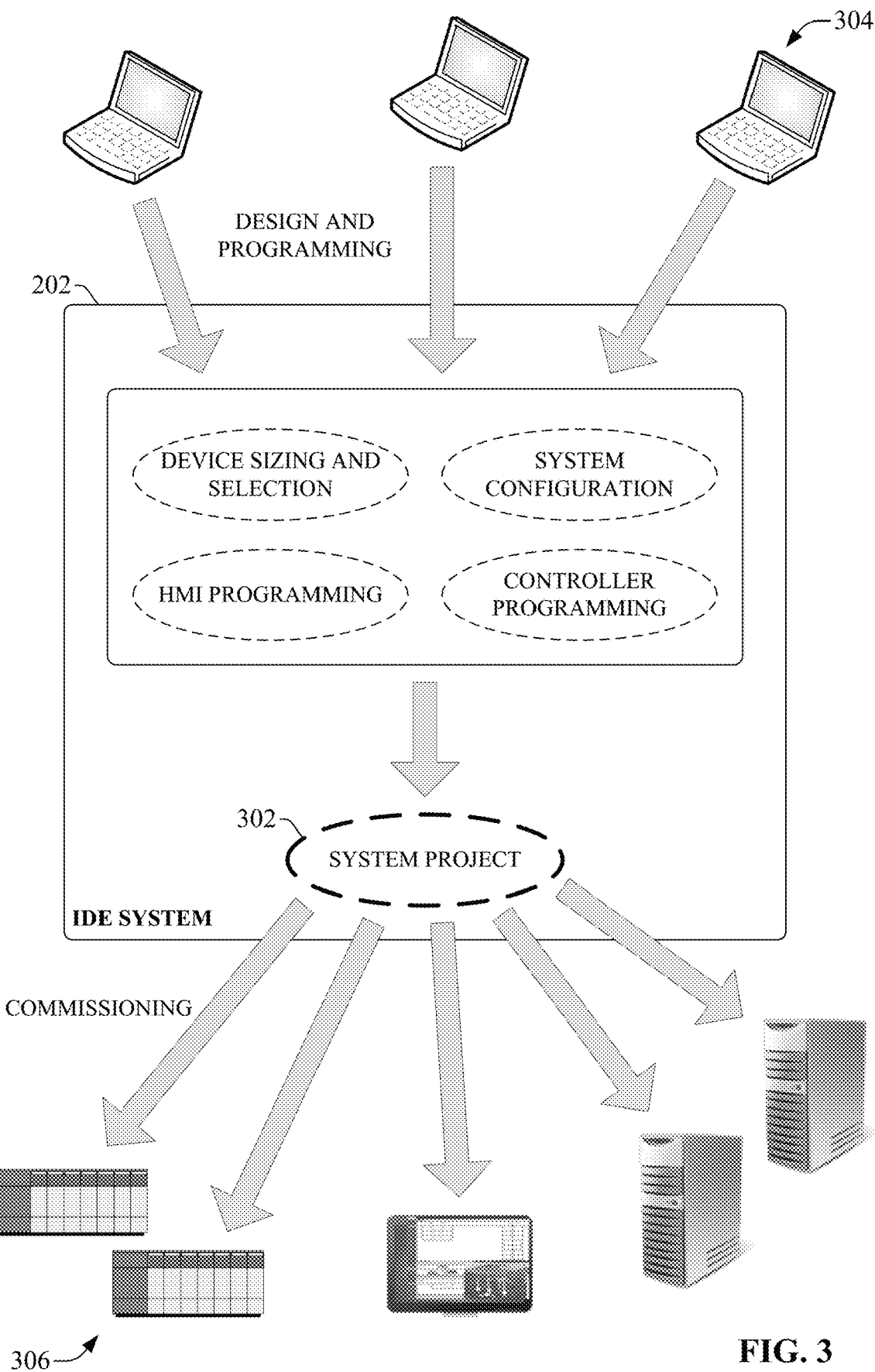
FIG. 3 is a diagram illustrating a generalized architecture of an industrial IDE system.

FIG. 3 is a diagram illustrating a generalized architecture of the industrial IDE system 202 according to one or more embodiments. Industrial IDE system 202 can implement a common set of services and workflows spanning not only design, but also commissioning, operation, and maintenance. In terms of design, the IDE system 202 can support not only industrial controller programming and HMI development, but also sizing and selection of system components, device/system configuration, AR/VR visualizations, and other features. The IDE system 202 can also include tools that simplify and automate commissioning of the resulting project and assist with subsequent administration of the deployed system during runtime.

Embodiments of the IDE system 202 that are implemented on a cloud platform also facilitate collaborative project development whereby multiple developers 304 contribute design and programming input to a common automation system project 302. Collaborative tools supported by the IDE system can manage design contributions from the multiple contributors and perform version control of the aggregate system project 302 to ensure project consistency.

Based on design and programming input from one or more developers 304, IDE system 202 generates a system project 302 comprising one or more project files. The system project 302 encodes one or more of control programming; HMI, AR, and/or VR visualizations; device or sub-system configuration data (e.g., drive parameters, vision system configurations, telemetry device parameters, safety zone definitions, etc.); or other such aspects of an industrial automation system being designed. IDE system 202 can identify the appropriate target devices 306 on which respective aspects of the system project 302 should be executed (e.g., industrial controllers, HMI terminals, variable frequency drives, safety devices, etc.), translate the system project 302 to executable files that can be executed on the respective target devices, and deploy the executable files to their corresponding target devices 306 for execution, thereby commissioning the system project 302 to the plant floor for implementation of the automation project.

Figure 4:
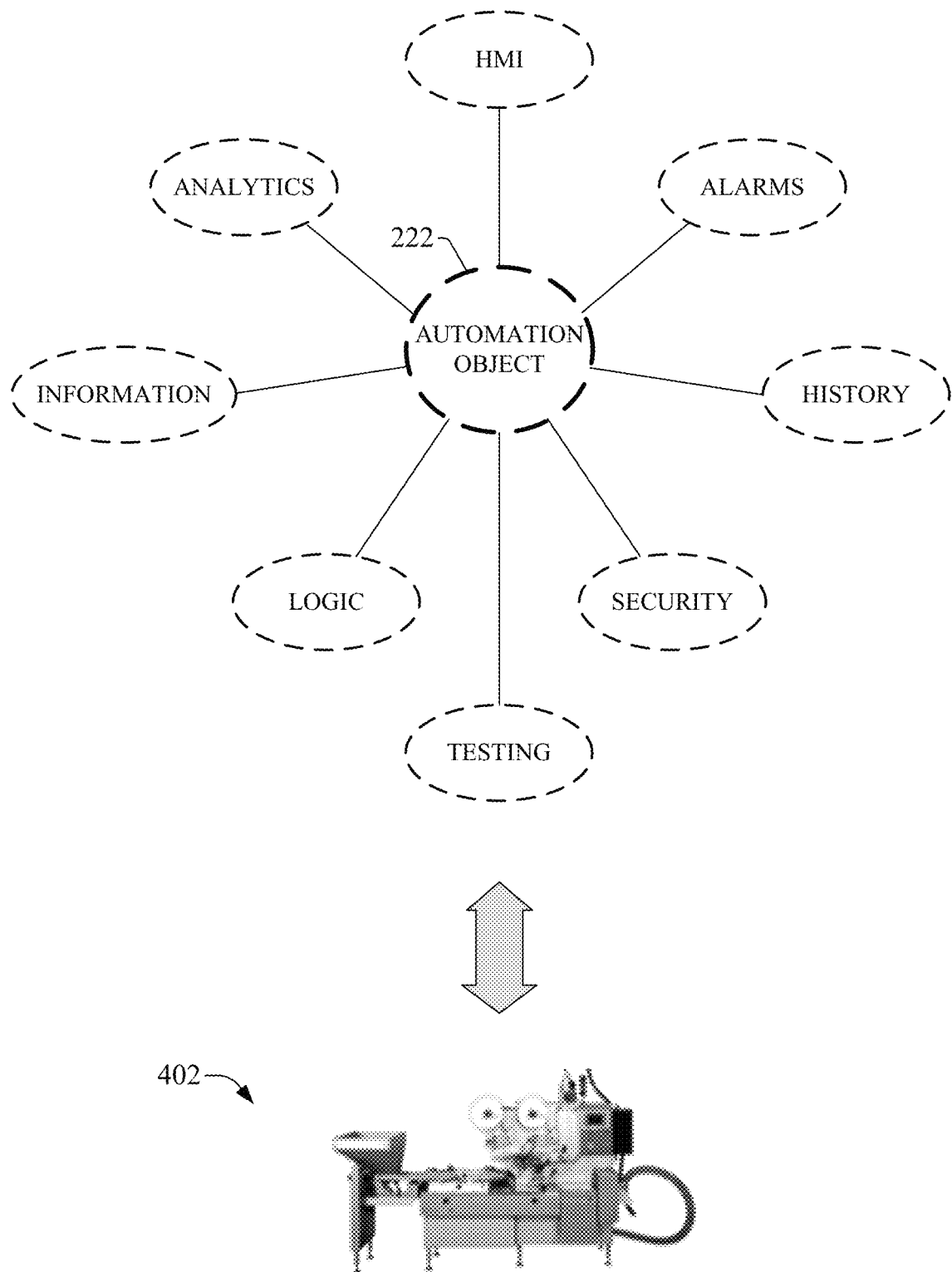
FIG. 4 is a diagram illustrating several example automation object properties that can be leveraged by an industrial IDE system in connection with building, deploying, and executing a system project.

To support enhanced development capabilities, some embodiments of IDE system 202 can be built on an object-based data model rather than, or in addition to, a tag-based architecture. Automation objects 222 serve as the building block for this object-based development architecture. FIG. 4 is a diagram illustrating several example automation object properties that can be leveraged by the IDE system 202 in connection with building, deploying, and executing a system project 302. Automation objects 222 can be created and augmented during design, integrated into larger data models, and consumed during runtime. These automation objects 222 provide a common data structure across the IDE system 202 and can be stored in an object library (e.g., part of memory 220) for reuse. The object library can store predefined automation objects 222 representing various classifications of real-world industrial assets 402, including but not limited to pumps, tanks, values, motors, motor drives (e.g., variable frequency drives), industrial robots, actuators (e.g., pneumatic or hydraulic actuators), or other such assets. Automation objects 222 can represent elements at substantially any level of an industrial enterprise, including individual devices, machines made up of many industrial devices and components (some of which may be associated with their own automation objects 222), and entire production lines or process control systems.

An automation object 222 for a given type of industrial asset can encode such aspects as 2D or 3D visualizations, alarms, control coding (e.g., logic or other type of control programming), analytics, startup procedures, testing protocols and scripts, validation reports, simulations, schematics, security protocols, and other such properties associated with the industrial asset 402 represented by the object 222. Automation objects 222 can also be geotagged with location information identifying the location of the associated asset. During runtime of the system project 302, the automation object 222 corresponding to a given real-world asset 402 can also record status or operational history data for the asset. In general, automation objects 222 serve as programmatic representations of their corresponding industrial assets 402, and can be incorporated into a system project 302 as elements of control code, a 2D or 3D visualization, a knowledgebase or maintenance guidance system for the industrial assets, or other such aspects. Also, as will be discussed in more detail below, automation objects 222 can support inheritance, such that changes to any of the attributes of an automation object 222 discussed above are automatically propagated to instances of the automation object used throughout a system project 302.

Figure 5:
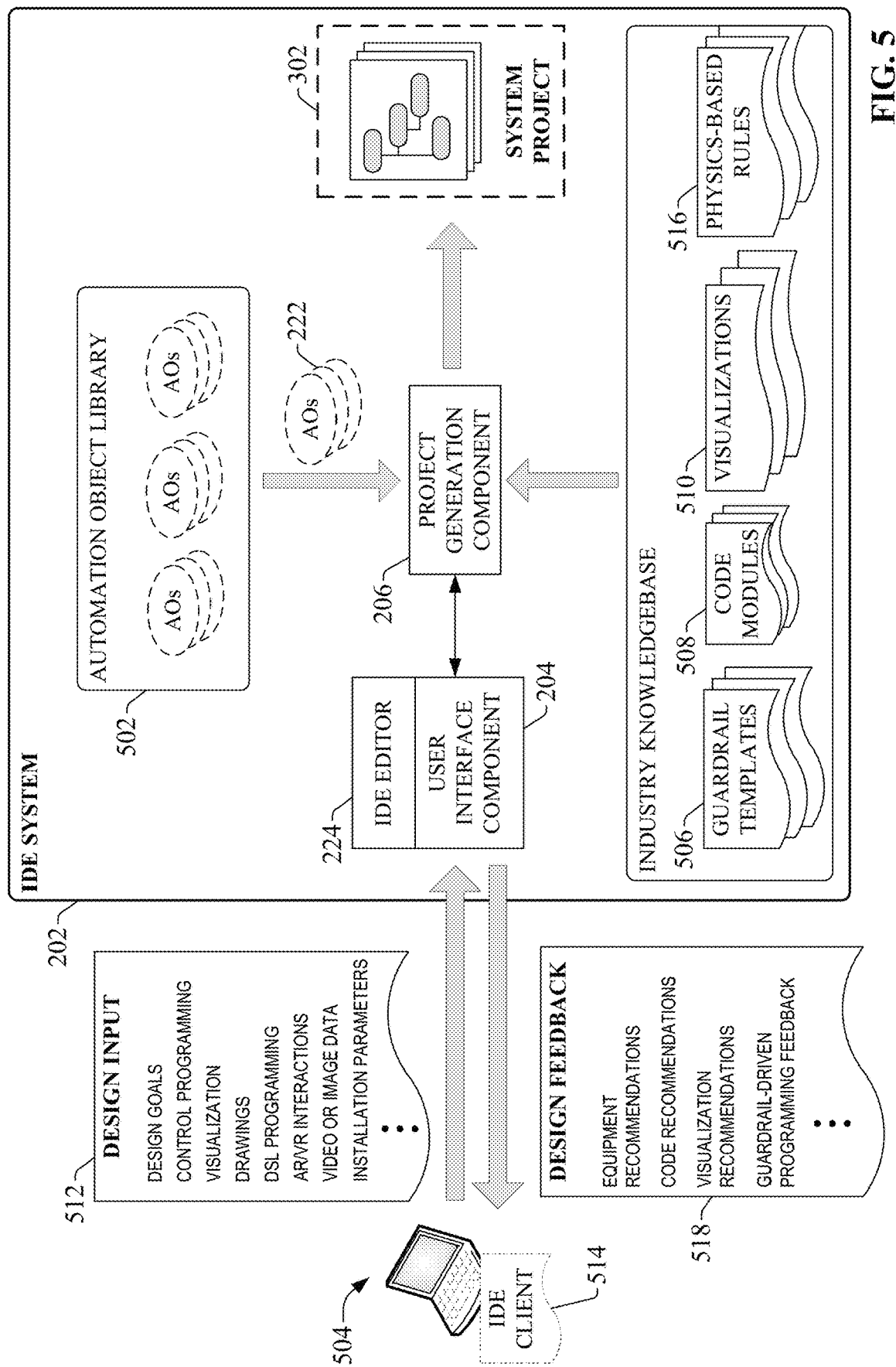
FIG. 5 is a diagram illustrating example data flows associated with creation of a system project for an automation system being designed using and industrial IDE system.

FIG. 5 is a diagram illustrating example data flows associated with creation of a system project 302 for an automation system being designed using IDE system 202 according to one or more embodiments. A client device 504 (e.g., a laptop computer, tablet computer, desktop computer, mobile device, wearable AR/VR appliance, etc.) executing an IDE client application 514 can access the IDE system's project development tools and leverage these tools to create a comprehensive system project 302 for an automation system being developed. Through interaction with the system's user interface component 204, developers can submit design input 512 to the IDE system 202 in various supported formats, including industry-specific control programming (e.g., control logic, structured text, sequential function charts, etc.) and HMI screen configuration input. Based on this design input 512 and information stored in an industry knowledgebase (predefined code modules 508 and visualizations 510, guardrail templates 506, physics-based rules 516, etc.), user interface component 204 renders design feedback 518 designed to assist the developer in connection with developing a system project 302 for configuration, control, and visualization of an industrial automation system.

In addition to control programming and visualization definitions, some embodiments of IDE system 202 can be configured to receive digital engineering drawings (e.g., computer-aided design (CAD) files) as design input 512. In such embodiments, project generation component 206 can generate portions of the system project 302—e.g., by automatically generating control and/or visualization code—based on analysis of existing design drawings. Drawings that can be submitted as design input 512 can include, but are not limited to, P&ID drawings, mechanical drawings, flow diagrams, or other such documents. For example, a P&ID drawing can be imported into the IDE system 202, and project generation component 206 can identify elements (e.g., tanks, pumps, etc.) and relationships therebetween conveyed by the drawings. Project generation component 206 can associate or map elements identified in the drawings with appropriate automation objects 222 corresponding to these elements (e.g., tanks, pumps, etc.) and add these automation objects 222 to the system project 302. The device-specific and asset-specific automation objects 222 include suitable code and visualizations to be associated with the elements identified in the drawings. In general, the IDE system 202 can examine one or more different types of drawings (mechanical, electrical, piping, etc.) to determine relationships between devices, machines, and/or assets (including identifying common elements across different drawings) and intelligently associate these elements with appropriate automation objects 222, code modules 508, and/or visualizations 510. The IDE system 202 can leverage physics-based rules 516 as well as pre-defined code modules 508 and visualizations 510 as necessary in connection with generating code or project data for system project 302.

The IDE system 202 can also determine whether pre-defined visualization content is available for any of the objects discovered in the drawings and generate appropriate HMI screens or AR/VR content for the discovered objects based on these pre-defined visualizations. To this end, the IDE system 202 can store industry-specific, asset-specific, and/or application-specific visualizations 510 that can be accessed by the project generation component 206 as needed. These visualizations 510 can be classified according to industry or industrial vertical (e.g., automotive, food and drug, oil and gas, pharmaceutical, etc.), type of industrial asset (e.g., a type of machine or industrial device), a type of industrial application (e.g., batch processing, flow control, web tension control, sheet metal stamping, water treatment, etc.), or other such categories. Predefined visualizations 510 can comprise visualizations in a variety of formats, including but not limited to HMI screens or windows, mashups that aggregate data from multiple pre-specified sources, AR overlays, VR objects representing 3D virtualizations of the associated industrial asset, or other such visualization formats. IDE system 202 can select a suitable visualization for a given object based on a predefined association between the object type and the visualization content.

In another example, markings applied to an engineering drawing by a user can be understood by some embodiments of the project generation component 206 to convey a specific design intention or parameter. For example, a marking in red pen can be understood to indicate a safety zone, two circles connected by a dashed line can be interpreted as a gearing relationship, and a bold line may indicate a camming relationship. In this way, a designer can sketch out design goals on an existing drawing in a manner that can be understood and leveraged by the IDE system 202 to generate code and visualizations. In another example, the project generation component 206 can learn permissives and interlocks (e.g., valves and their associated states) that serve as necessary preconditions for starting a machine based on analysis of the user's CAD drawings. Project generation component 206 can generate any suitable code (ladder logic, function blocks, etc.), device configurations, and visualizations based on analysis of these drawings and markings for incorporation into system project 302. In some embodiments, user interface component 204 can include design tools for developing engineering drawings within the IDE platform itself, and the project generation component 206 can generate this code as a background process as the user is creating the drawings for a new project. In some embodiments, project generation component 206 can also translate state machine drawings to a corresponding programming sequence, yielding at least skeletal code that can be enhanced by the developer with additional programming details as needed.

Also, or in addition, some embodiments of IDE system 202 can support goal-based automated programming For example, the user interface component 204 can allow the user to specify production goals for an automation system being designed (e.g., specifying that a bottling plant being designed must be capable of producing at least 5000 bottles per second during normal operation) and any other relevant design constraints applied to the design project (e.g., budget limitations, available floor space, available control cabinet space, etc.). Based on this information, the project generation component 206 will generate portions of the system project 302 to satisfy the specified design goals and constraints. Portions of the system project 302 that can be generated in this manner can include, but are not limited to, device and equipment selections (e.g., definitions of how many pumps, controllers, stations, conveyors, drives, or other assets will be needed to satisfy the specified goal), associated device configurations (e.g., tuning parameters, network settings, drive parameters, etc.), control coding, or HMI screens suitable for visualizing the automation system being designed.

Some embodiments of the project generation component 206 can also generate at least some of the project code for system project 302 based on knowledge of parts that have been ordered for the project being developed. This can involve accessing the customer's account information maintained by an equipment vendor to identify devices that have been purchased for the project. Based on this information the project generation component 206 can add appropriate automation objects 222 and associated code modules 508 corresponding to the purchased assets, thereby providing a starting point for project development.

Some embodiments of project generation component 206 can also monitor customer-specific design approaches for commonly programmed functions (e.g., pumping applications, batch processes, palletizing operations, etc.) and generate recommendations for design modules (e.g., code modules 508, visualizations 510, etc.) that the user may wish to incorporate into a current design project based on an inference of the designer's goals and learned approaches to achieving the goal. To this end, some embodiments of project generation component 206 can be configured to monitor design input 512 over time and, based on this monitoring, learn correlations between certain design actions (e.g., addition of certain code modules or snippets to design projects, selection of certain visualizations, etc.) and types of industrial assets, industrial sequences, or industrial processes being designed. Project generation component 206 can record these learned correlations and generate recommendations during subsequent project development sessions based on these correlations. For example, if project generation component 206 determines, based on analysis of design input 512, that a designer is currently developing a control project involving a type of industrial equipment that has been programmed and/or visualized in the past in a repeated, predictable manner, the project generation component 206 can instruct user interface component 204 to render recommended development steps or code modules 508 the designer may wish to incorporate into the system project 302 based on how this equipment was configured and/or programmed in the past.

In some embodiments, IDE system 202 can also store and implement guardrail templates 506 that define design guardrails intended to ensure the project's compliance with internal or external design standards. Based on design parameters defined by one or more selected guardrail templates 506, user interface component 204 can provide, as a subset of design feedback 518, dynamic recommendations or other types of feedback designed to guide the developer in a manner that ensures compliance of the system project 302 with internal or external requirements or standards (e.g., certifications such as TUV certification, in-house design standards, industry-specific or vertical-specific design standards, etc.). This feedback 518 can take the form of text-based recommendations (e.g., recommendations to rewrite an indicated portion of control code to comply with a defined programming standard), syntax highlighting, error highlighting, auto-completion of code snippets, or other such formats. In this way, IDE system 202 can customize design feedback 518—including programming recommendations, recommendations of predefined code modules 508 or visualizations 510, error and syntax highlighting, etc.—in accordance with the type of industrial system being developed and any applicable in-house design standards.

Guardrail templates 506 can also be designed to maintain compliance with global best practices applicable to control programming or other aspects of project development. For example, user interface component 204 may generate and render an alert if a developer's control programing is deemed to be too complex as defined by criteria specified by one or more guardrail templates 506. Since different verticals (e.g., automotive, pharmaceutical, oil and gas, food and drug, marine, etc.) must adhere to different standards and certifications, the IDE system 202 can maintain a library of guardrail templates 506 for different internal and external standards and certifications, including customized user-specific guardrail templates 506. These guardrail templates 506 can be classified according to industrial vertical, type of industrial application, plant facility (in the case of custom in-house guardrail templates 506) or other such categories. During development, project generation component 206 can select and apply a subset of guardrail templates 506 determined to be relevant to the project currently being developed, based on a determination of such aspects as the industrial vertical to which the project relates, the type of industrial application being programmed (e.g., flow control, web tension control, a certain batch process, etc.), or other such aspects. Project generation component 206 can leverage guardrail templates 506 to implement rules-based programming, whereby programming feedback (a subset of design feedback 518) such as dynamic intelligent autocorrection, type-aheads, or coding suggestions are rendered based on encoded industry expertise and best practices (e.g., identifying inefficiencies in code being developed and recommending appropriate corrections).

Users can also run their own internal guardrail templates 506 against code provided by outside vendors (e.g., OEMs) to ensure that this code complies with in-house programming standards. In such scenarios, vendor-provided code can be submitted to the IDE system 202, and project generation component 206 can analyze this code in view of in-house coding standards specified by one or more custom guardrail templates 506. Based on results of this analysis, user interface component 204 can indicate portions of the vendor-provided code (e.g., using highlights, overlaid text, etc.) that do not conform to the programming standards set forth by the guardrail templates 506, and display suggestions for modifying the code in order to bring the code into compliance. As an alternative or in addition to recommending these modifications, some embodiments of project generation component 206 can be configured to automatically modify the code in accordance with the recommendations to bring the code into conformance.

In making coding suggestions as part of design feedback 518, project generation component 206 can invoke selected code modules 508 stored in a code module database or selected automation objects 222 stored in an automation object library 502 (e.g., on memory 220). Code modules 508 comprise standardized coding segments for controlling common industrial tasks or applications (e.g., palletizing, flow control, web tension control, pick-and-place applications, conveyor control, etc.). Similarly, automation objects 222 representing respective industrial assets may have associated therewith standardize control code for monitoring and controlling their respective assets. In some embodiments, code modules 508 and/or automation objects 222 can be categorized according to one or more of an industrial vertical (e.g., automotive, food and drug, oil and gas, textiles, marine, pharmaceutical, etc.), an industrial application, or a type of machine or device to which the code module 508 or automation object 222 is applicable.

In some embodiments, project generation component 206 can infer a programmer's current programming task or design goal based on programmatic input being provided by the programmer (as a subset of design input 512), and determine, based on this task or goal, whether one of the pre-defined code modules 508 or automation objects 222 may be appropriately added to the control program being developed to achieve the inferred task or goal. For example, project generation component 206 may infer, based on analysis of design input 512, that the programmer is currently developing control code for transferring material from a first tank to another tank, and in response, recommend inclusion of a predefined code module 508 comprising standardized or frequently utilized code for controlling the valves, pumps, or other assets necessary to achieve the material transfer. Similarly, the project generation component 206 may recommend inclusion of an automation object 222 representing one of the tanks, or one of the other industrial assets involved in transferring the material (e.g., a valve, a pump, etc.), where the recommended automation object 222 includes associated control code for controlling its associated asset as well as a visualization object that can be used to visualize the asset on an HMI application or another visualization application.

Customized guardrail templates 506 can also be defined to capture nuances of a customer site that should be taken into consideration in the project design. For example, a guardrail template 506 could record the fact that the automation system being designed will be installed in a region where power outages are common, and will factor this consideration when generating design feedback 518; e.g., by recommending implementation of backup uninterruptable power supplies and suggesting how these should be incorporated, as well as recommending associated programming or control strategies that take these outages into account.

IDE system 202 can also use guardrail templates 506 to guide user selection of equipment or devices for a given design goal; e.g., based on the industrial vertical, type of control application (e.g., sheet metal stamping, die casting, palletization, conveyor control, web tension control, batch processing, etc.), budgetary constraints for the project, physical constraints at the installation site (e.g., available floor, wall or cabinet space; dimensions of the installation space; etc.), equipment already existing at the site, etc. Some or all of these parameters and constraints can be provided as design input 512, and user interface component 204 can render the equipment recommendations as a subset of design feedback 518. In conjunction with this equipment recommendation, the project generation component 206 can also recommend inclusion of corresponding automation objects 222 representing the recommended equipment for inclusion in the system project 302.

In some embodiments, project generation component 206 can also determine whether some or all existing equipment can be repurposed for the new control system being designed. For example, if a new bottling line is to be added to a production area, there may be an opportunity to leverage existing equipment since some bottling lines already exist. The decision as to which devices and equipment can be reused will affect the design of the new control system. Accordingly, some of the design input 512 provided to the IDE system 202 can include specifics of the customer's existing systems within or near the installation site. In some embodiments, project generation component 206 can apply artificial intelligence (AI) or traditional analytic approaches to this information to determine whether existing equipment specified in design in put 512 can be repurposed or leveraged. Based on results of this analysis, project generation component 206 can generate, as design feedback 518, a list of any new equipment that may need to be purchased based on these decisions.

In some embodiments, IDE system 202 can offer design recommendations based on an understanding of the physical environment within which the automation system being designed will be installed. To this end, information regarding the physical environment can be submitted to the IDE system 202 (as part of design input 512) in the form of 2D or 3D images or video of the plant environment. This environmental information can also be obtained from an existing digital twin of the plant, or by analysis of scanned environmental data obtained by a wearable AR appliance in some embodiments. Project generation component 206 can analyze this image, video, or digital twin data to identify physical elements within the installation area (e.g., walls, girders, safety fences, existing machines and devices, etc.) and physical relationships between these elements. This can include ascertaining distances between machines, lengths of piping runs, locations and distances of wiring harnesses or cable trays, etc. Based on results of this analysis, project generation component 206 can add context to schematics generated as part of system project 302, generate recommendations regarding optimal locations for devices or machines (e.g., recommending a minimum separation between power and data cables), or make other refinements to the system project 302. At least some of this design data can be generated based on physics-based rules 516, which can be referenced by project generation component 206 to determine such physical design specifications as minimum safe distances from hazardous equipment (which may also factor into determining suitable locations for installation of safety devices relative to this equipment, given expected human or vehicle reaction times defined by the physics-based rules 516), material selections capable of withstanding expected loads, piping configurations and tuning for a specified flow control application, wiring gauges suitable for an expected electrical load, minimum distances between signal wiring and electromagnetic field (EMF) sources to ensure negligible electrical interference on data signals, or other such design features that are dependent on physical rules.

In an example use case, relative locations of machines and devices specified by physical environment information submitted to the IDE system 202 can be used by the project generation component 206 to generate design data for an industrial safety system. For example, project generation component 206 can analyze distance measurements between safety equipment and hazardous machines and, based on these measurements, determine suitable placements and configurations of safety devices and associated safety controllers that ensure the machine will shut down within a sufficient safety reaction time to prevent injury (e.g., in the event that a person runs through a light curtain).

In some embodiments, project generation component 206 can also analyze photographic or video data of an existing machine to determine inline mechanical properties such as gearing or camming and factor this information into one or more guardrail templates 506 or design recommendations.

Figure 6:
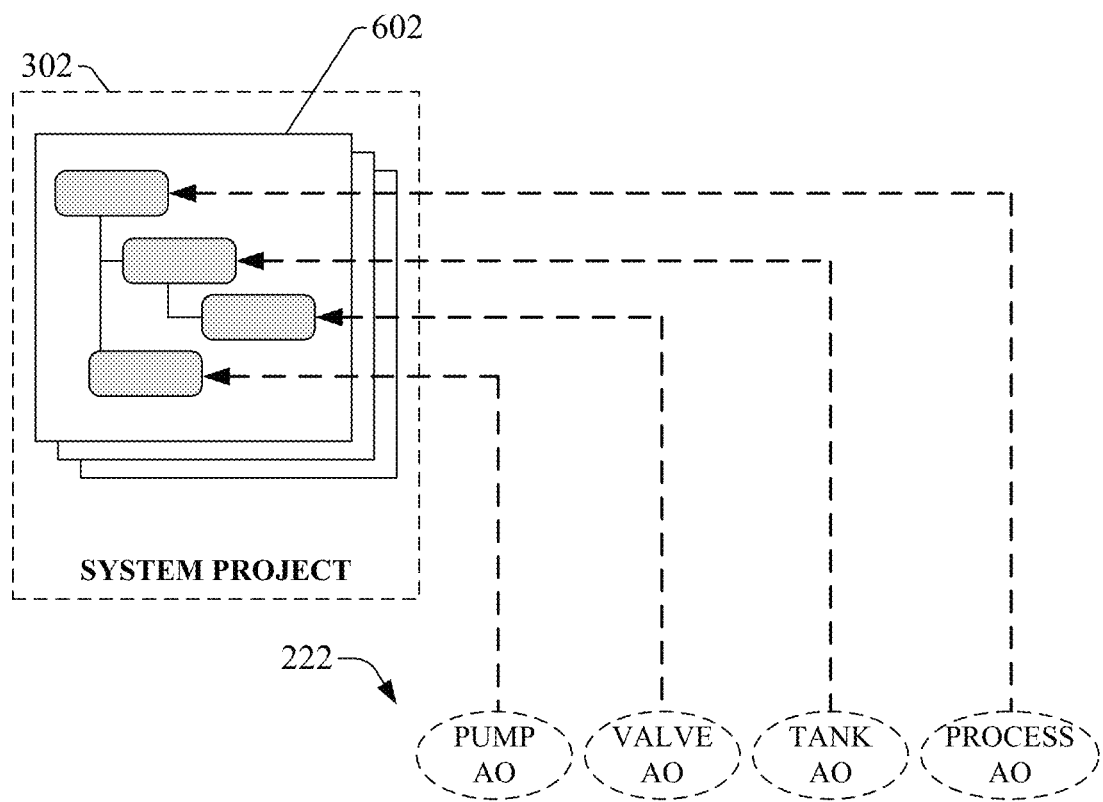
FIG. 6 is a diagram illustrating an example system project that incorporates automation objects into a project model.

As noted above, the system project 302 generated by IDE system 202 for a given automaton system being designed can be built upon an object-based architecture that uses automation objects 222 as building blocks. FIG. 6 is a diagram illustrating an example system project 302 that incorporates automation objects 222 into the project model. In this example, various automation objects 222 representing analogous industrial devices, systems, or assets of an automation system (e.g., processes, tanks, valves, pumps, etc.) have been incorporated into system project 302 as elements of a larger project data model 602. The project data model 602 also defines hierarchical relationships between these automation objects 222. According to an example relationship, a process automation object representing a batch process may be defined as a parent object to a number of child objects representing devices and equipment that carry out the process, such as tanks, pumps, and valves. Each automation object 222 has associated therewith object properties or attributes specific to its corresponding industrial asset (e.g., those discussed above in connection with FIG. 4), including executable control programming for controlling the asset (or for coordinating the actions of the asset with other industrial assets) and visualizations that can be used to render relevant information about the asset during runtime.

At least some of the attributes of each automation object 222 are default properties defined by the IDE system 202 based on encoded industry expertise pertaining to the asset represented by the objects. These default properties can include, for example, industry-standard or recommended control code for monitoring and controlling the asset represented by the automation object 222, a 2D or 3D graphical object that can be used to visualize operational or statistical data for the asset, alarm conditions associated with the asset, analytic or reporting scripts designed to yield actionable insights into the asset's behavior, or other such properties. Other properties can be modified or added by the developer as needed (via design input 512) to customize the automation object 222 for the particular asset and/or industrial application for which the system projects 302 is being developed. This can include, for example, associating customized control code, HMI screens, AR presentations, or help files associated with selected automation objects 222. In this way, automation objects 222 can be created and augmented as needed during design for consumption or execution by target control devices during runtime.

Figure 7:
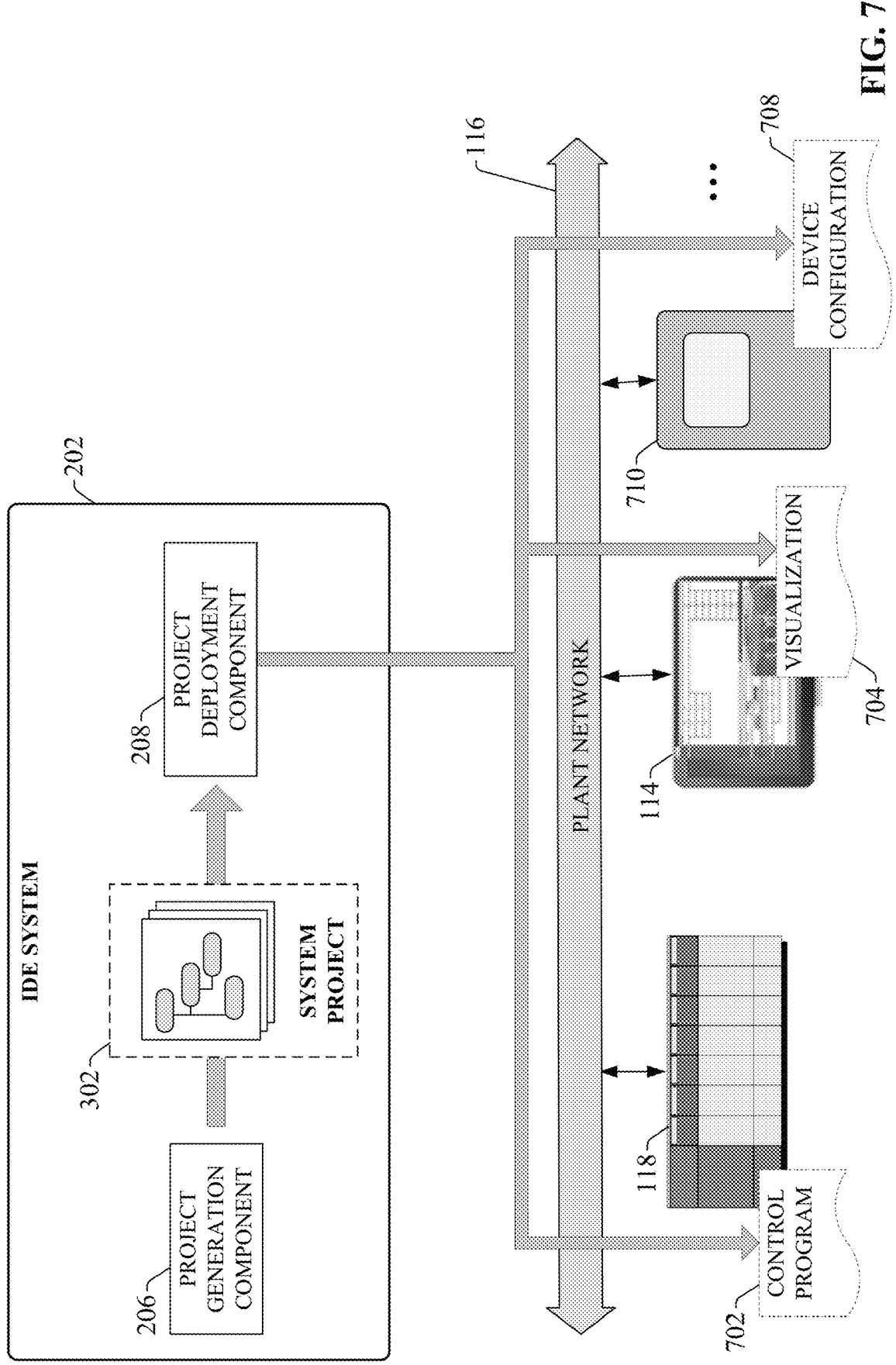
FIG. 7 is a diagram illustrating commissioning of a system project.

Once development and testing on a system project 302 has been completed, commissioning tools supported by the IDE system 202 can simplify the process of commissioning the project in the field. When the system project 302 for a given automation system has been completed, the system project 302 can be deployed to one or more target control devices for execution. FIG. 7 is a diagram illustrating commissioning of a system project 302. Project deployment component 208 can compile or otherwise translate a completed system project 302 into one or more executable files or configuration files that can be stored and executed on respective target industrial devices of the automation system (e.g., industrial controllers 118, HMI terminals 114 or other types of visualization systems, motor drives 710, telemetry devices, vision systems, safety relays, etc.).

Conventional control program development platforms require the developer to specify the type of industrial controller (e.g., the controller's model number) on which the control program will run prior to development, thereby binding the control programming to a specified controller. Controller-specific guardrails are then enforced during program development which limit how the program is developed given the capabilities of the selected controller. By contrast, some embodiments of the IDE system 202 can abstract project development from the specific controller type, allowing the designer to develop the system project 302 as a logical representation of the automation system in a manner that is agnostic to where and how the various control aspects of system project 302 will run. Once project development is complete and system project 302 is ready for commissioning, the user can specify (via user interface component 204) target devices on which respective aspects of the system project 302 are to be executed. In response, an allocation engine of the project deployment component 208 will translate aspects of the system project 302 to respective executable files formatted for storage and execution on their respective target devices.

For example, system project 302 may include—among other project aspects—control code, visualization screen definitions, and motor drive parameter definitions. Upon completion of project development, a user can identify which target devices—including an industrial controller 118, an HMI terminal 114, and a motor drive 710—are to execute or receive these respective aspects of the system project 302. Project deployment component 208 can then translate the controller code defined by the system project 302 to a control program file 702 formatted for execution on the specified industrial controller 118 and send this control program file 702 to the controller 118 (e.g., via plant network 116). Similarly, project deployment component 208 can translate the visualization definitions and motor drive parameter definitions to a visualization application 704 and a device configuration file 708, respectively, and deploy these files to their respective target devices for execution and/or device configuration.

In general, project deployment component 208 performs any conversions necessary to allow aspects of system project 302 to execute on the specified devices. Any inherent relationships, handshakes, or data sharing defined in the system project 302 are maintained regardless of how the various elements of the system project 302 are distributed. In this way, embodiments of the IDE system 202 can decouple the project from how and where the project is to be run. This also allows the same system project 302 to be commissioned at different plant facilities having different sets of control equipment. That is, some embodiments of the IDE system 202 can allocate project code to different target devices as a function of the particular devices found on-site. IDE system 202 can also allow some portions of the project file to be commissioned as an emulator or on a cloud-based controller.

As an alternative to having the user specify the target control devices to which the system project 302 is to be deployed, some embodiments of IDE system 202 can actively connect to the plant network 116 and discover available devices, ascertain the control hardware architecture present on the plant floor, infer appropriate target devices for respective executable aspects of system project 302, and deploy the system project 302 to these selected target devices. As part of this commissioning process, IDE system 202 can also connect to remote knowledgebases (e.g., web-based or cloud-based knowledgebases) to determine which discovered devices are out of date or require firmware upgrade to properly execute the system project 302. In this way, the IDE system 202 can serve as a link between device vendors and a customer's plant ecosystem via a trusted connection in the cloud.

Copies of system project 302 can be propagated to multiple plant facilities having varying equipment configurations using smart propagation, whereby the project deployment component 208 intelligently associates project components with the correct industrial asset or control device even if the equipment on-site does not perfectly match the defined target (e.g., if different pump types are found at different sites). For target devices that do not perfectly match the expected asset, project deployment component 208 can calculate the estimated impact of running the system project 302 on non-optimal target equipment and generate warnings or recommendations for mitigating expected deviations from optimal project execution.

Figure 8:
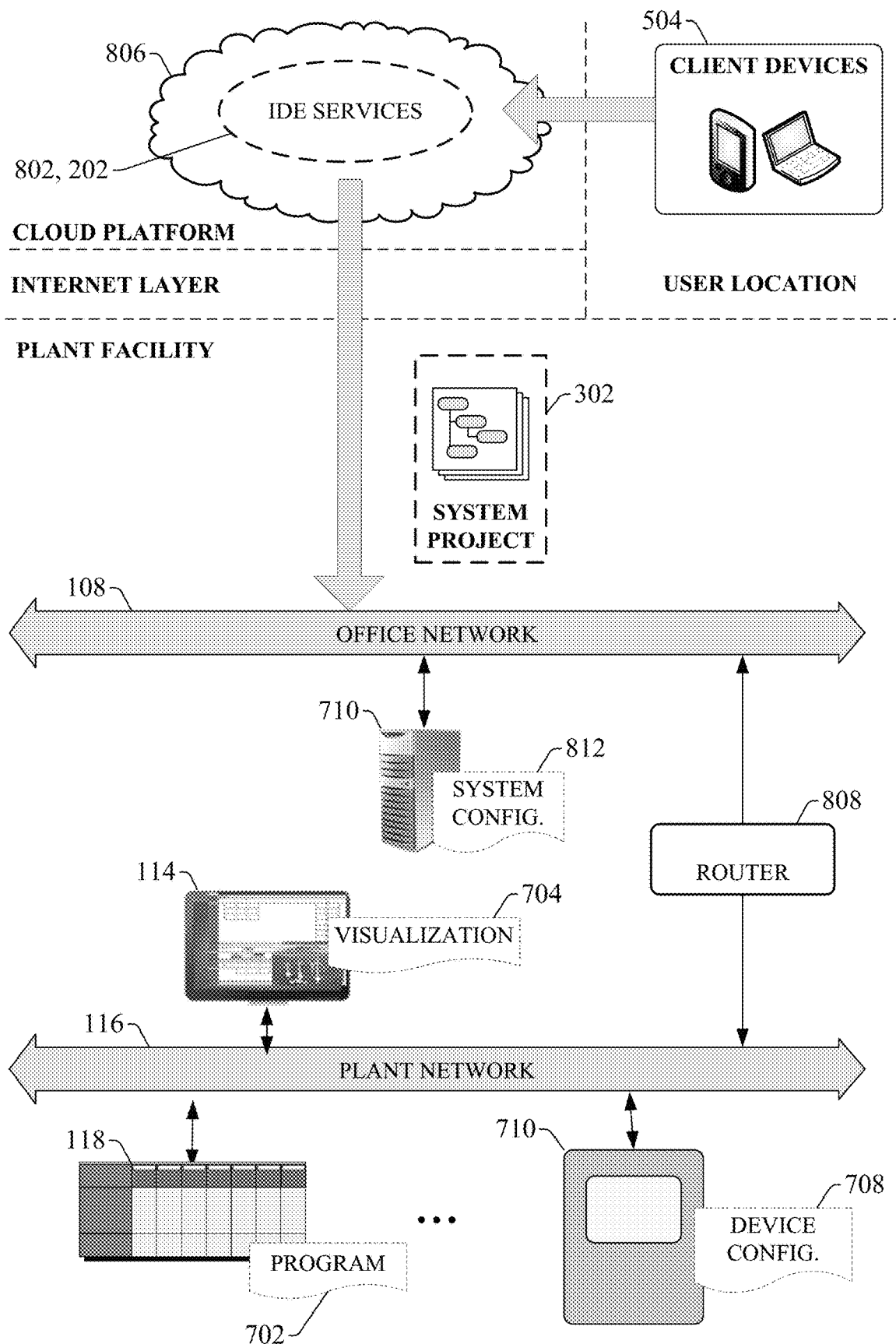
FIG. 8 is a diagram illustrating an example architecture in which cloud-based IDE services are used to develop and deploy industrial applications to a plant environment.

As noted above, some embodiments of IDE system 202 can be embodied on a cloud platform. FIG. 8 is a diagram illustrating an example architecture in which cloud-based IDE services 802 are used to develop and deploy industrial applications to a plant environment. In this example, the industrial environment includes one or more industrial controllers 118, HMI terminals 114, motor drives 710, servers 801 running higher level applications (e.g., ERP, MES, etc.), and other such industrial assets. These industrial assets are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, the high-level servers 810 reside on a separate office network 108 that is connected to the plant network 116 (e.g., through a router 808 or other network infrastructure device).

In this example, IDE system 202 resides on a cloud platform 806 and executes as a set of cloud-based IDE service 802 that are accessible to authorized remote client devices 504. Cloud platform 806 can be any infrastructure that allows shared computing services (such as IDE services 802) to be accessed and utilized by cloud-capable devices. Cloud platform 806 can be a public cloud accessible via the Internet by devices 504 having Internet connectivity and appropriate authorizations to utilize the IDE services 802. In some scenarios, cloud platform 806 can be provided by a cloud provider as a platform-as-a-service (PaaS), and the IDE services 802 can reside and execute on the cloud platform 806 as a cloud-based service. In some such configurations, access to the cloud platform 806 and associated IDE services 802 can be provided to customers as a subscription service by an owner of the IDE services 802. Alternatively, cloud platform 806 can be a private cloud operated internally by the industrial enterprise (the owner of the plant facility). An example private cloud platform can comprise a set of servers hosting the IDE services 802 and residing on a corporate network protected by a firewall.

Cloud-based implementations of IDE system 202 can facilitate collaborative development by multiple remote developers who are authorized to access the IDE services 802. When a system project 302 is ready for deployment, the project 302 can be commissioned to the plant facility via a secure connection between the office network 108 or the plant network 116 and the cloud platform 806. As discussed above, the industrial IDE services 802 can translate system project 302 to one or more appropriate executable files— control program files 702, visualization applications 704, device configuration files 708, system configuration files 812—and deploy these files to the appropriate devices in the plant facility to facilitate implementation of the automation project.

Figure 9:
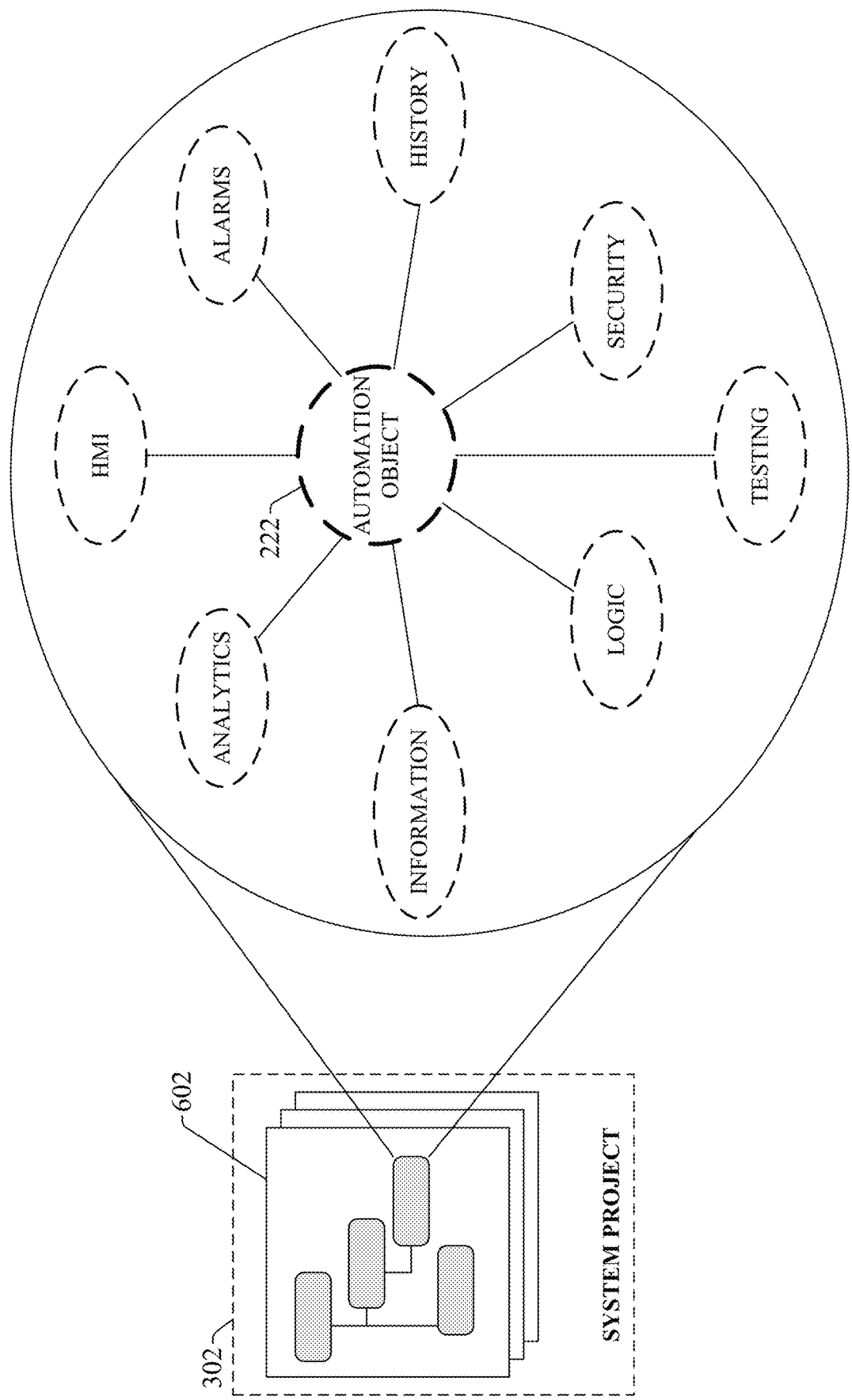
FIG. 9 is an illustration of an example automation object that has been integrated into the project data model of a system project.

As noted above, a system project 302 generated by embodiments of the industrial IDE system 202 can incorporate a number of automation objects 222. FIG. 9 is an illustration of an example automation object 222 that has been integrated into the project data model 602 of a system project 302. As discussed above in connection with FIGS. 4 and 6, a system project 302 can incorporate instances of automation objects 222 that serve as programmatic representations of industrial assets, processes, or other industrial entities. Assets that can be represented by a given automation object 222 can include device-level assets (e.g., motor drives, valves, pumps, etc.) as well as machine-level assets (stamping presses, tanks, tooling stations, etc.). An automation object 222 can represent an off-the-shelf industrial device or machine offered by device or equipment vendors, or may comprise custom automation objects 222 representing custom-built machines provided by an OEM or another type of machine builder.

The project data model 602 can define hierarchical relationships between multiple automation objects 222 that are integrated as part of the system project 302. These hierarchical relationships can represent the physical and/or functional relationships between the represented assets. According to an example relationship, a process automation object 222 representing a batch process may be defined as a parent object to a number of child automation objects 222 representing devices and equipment that carry out the process, such as tanks, pumps, and valves. In another example, an automation object 222 representing a machine or production line can be defined as a parent object, under which are defined a number of child automation objects 222 representing the workstations or sub-machines within the machine or production line. These child automation objects 222 can themselves have a number of child automation objects 222 representing the device-level assets that make up these workstations or sub-machines.

Each industrial object 222 can serve similar functions to those of data tags that serve as containers for input data received from, and output data sent to, its corresponding industrial asset (e.g., digital and analog data values received from the asset for processing by the system project 302, as well as digital and analog values generated by the system project 302 and sent to the asset). In addition, each industrial object 222 comprises a number of programmatic attributes relating to the industrial asset being represented, examples of which are discussed above in connection with FIG. 4. These attributes can include, for example, control logic that can be executed as part of the system project 302 to monitor and control the represented assets. This associated control logic can be pre-developed to exchange input and output data with its associated industrial asset via defined input and output tags corresponding to the asset's physical inputs and outputs (that is, the asset's digital and analog I/O). During execution of the control project 302, the object's control logic can process inputs received from the asset and generate outputs directed to the asset based on results of this processing.

Additionally, the control logic associated with respective different automation objects 222 defined by the project data model 602 as having a hierarchical relationship with one another can interact or cooperate based on these defined relationships. For example, based on a defined hierarchical relationship between a first automation object 222 representing a tank (defined as a parent object) and a second automation object 222 representing a valve associated with the tank (defined as a child of the first object), the system project 302 can link the two sets of control logic associated with the first and second automation objects 222, respectively, so that the control logic associated with the two automation objects 222 performs coordinated monitoring and control of the machine. Linking the two sets of control logic in this manner can comprise, for example, linking data tags of the child object 222 with corresponding data tags of the parent object 222 in accordance with the hierarchical relationship defined by the model 602.

Industrial object 222 can also include associated HMI objects that can be used by a visualization system (e.g., an HMI application, a 2D or 3D augmented reality or virtual reality system, etc.) to render an animated graphical representation of the asset. These HMI objects can include one or more HMI interface screens designed to render information about the asset (e.g., a reporting screen that renders statistical or operational data for the asset, a screen that renders an animated graphical representation of the asset, etc.), individual graphical objects representing the asset that can be imported into an industrial visualization application, or other such objects.

The automation object 222 can also include analytic scripts designed to analyze data generated by the asset to produce insights into the asset's performance or health. Example analytics that can be performed by an automation object's analytic scripts can include, but are not limited to, assessments of the asset's current health and predicted future health (e.g., determinations of the asset's predicted time to failure), determinations of when the asset requires maintenance, or other such metrics. As with the automation object's control logic, the analytics scripts can be designed to interface with known data items generated by the industrial asset (e.g., data tags that are specific to the asset) so that the data associated with these data items can be processed by the scripts.

The automation object 222 can also define alarm information associated with the industrial asset. This alarm information can include definitions of the conditions that trigger the alarm (e.g., when a specified data item representing an operational metric of the asset falls outside a defined range of normal behavior, when a state of a specified digital tag satisfies an alarm condition, etc.) as well as an alarm message to be rendered in response to the alarm trigger. This alarm information can be referenced by a visualization system (e.g., an HMI application, an augmented reality or virtual realty system, etc.), which can render alarm messages for the industrial asset based on the alarm definitions defined by the automation object 222.

Some embodiments of automation object 222 can also define test properties as part of a global testing framework supported by the IDE system 202. These test properties can include object-specific test scripts designed to test and debug the automation object 222 and associated aspects of system project 302 that reference the object 222. The object's test properties can also include object-specific test scenario definitions that define one or more test scenarios that may beneficially be run against the automation object 222 and associated project elements that reference the object 222. The test scenario definitions can be pre-designed based on industrial expertise regarding the industrial asset or process represented by the automation object 222. The test properties associated with automation objects 222 can mitigate the need to write test scripts to test and debug the system project 302.

Figure 10:
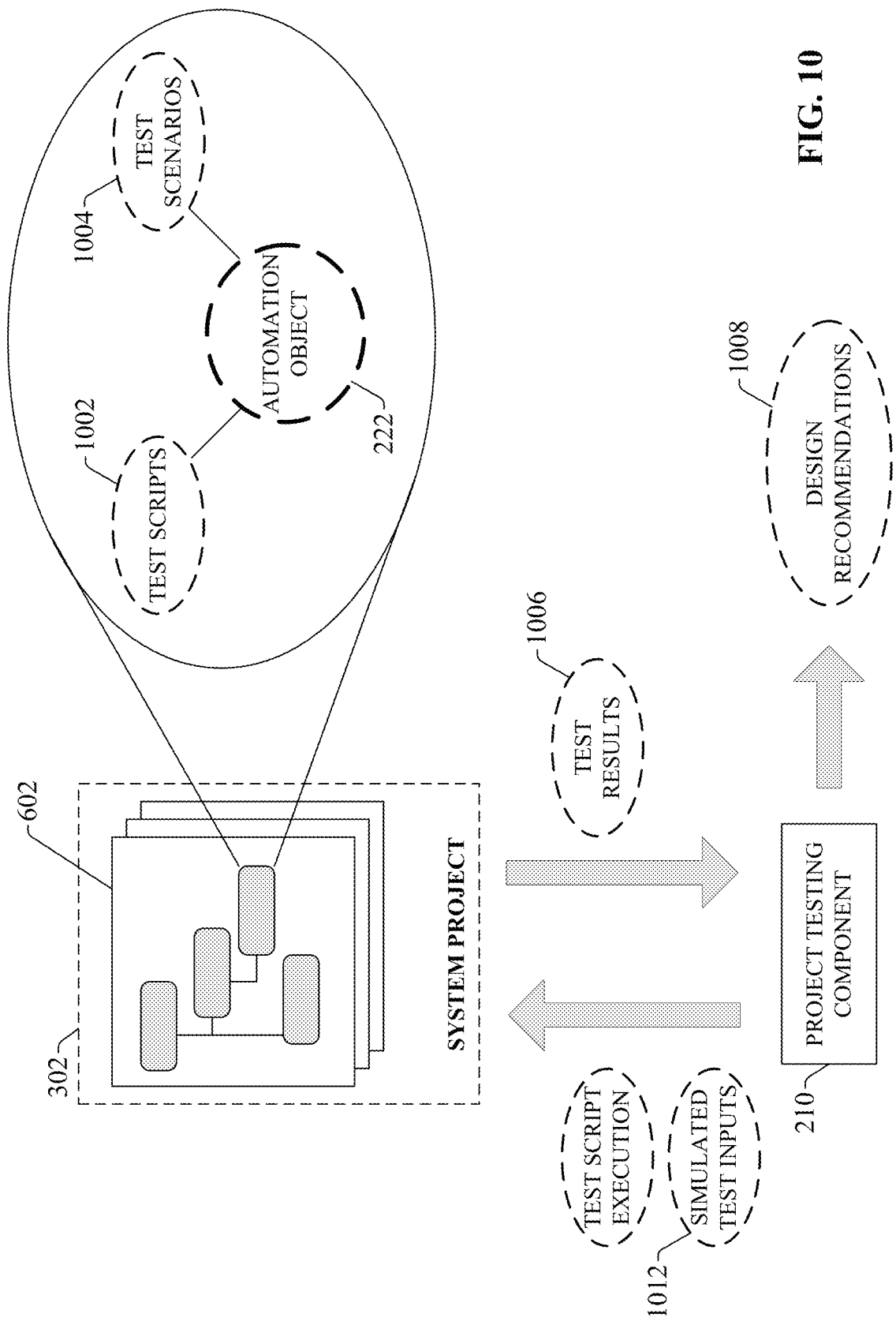
FIG. 10 is a diagram illustrating testing of an example system project by an IDE system's project testing component using test scripts bundled with an automation object.

FIG. 10 is a diagram illustrating testing of an example system project 302 by the IDE system's project testing component 210 using test scripts 1002 bundled with an automation object 222. Automation objects 222 can be provided with pre-bundled test scripts 1002 and/or definitions of test scenarios 1004 that are specific to the type of industrial asset represented by the automation object 222. During or after development of system project 302 as described above, the IDE system's project testing component 210 can execute test scripts 1002 associated with one or more selected automation objects 222 as appropriate to verify proper responses of the system project 302, thereby validating the project. To this end, test scripts 1002 can define simulated test inputs 1012 to be provided to the automation object 222 and/or associated project code in which the object 222 is used, as well as expected responses of the automation object 222 and its associated project code to the simulated inputs 1012.

According to an example testing procedure, project testing component 210 can execute one or more test scripts 1002 associated with respective one or more automation objects 222 against system project 302. Execution of the test scripts 1002 can involve, for example, feeding simulated test inputs 1012 to control code or other elements of system project 302 according to a sequence defined by the test scripts 1002, setting values of digital or analog program variables defined by the system project 302 according to a defined sequence, initiating control routines of the system project 302 according to a defined sequence, testing animation objects or other visualization elements defined by the system project 302, verifying data linkages between control routines, verifying relationships between program elements and drawing elements, confirming that device configuration settings or parameter values are appropriate for a given industrial application being carried out by the system project 302, or otherwise interacting with system project 302 according to testing procedures defined by the test scripts 1002. During testing, the project testing component 210 can monitor test results 1006 or responses of the system project 302 to the test interactions defined by the test scripts 1002 and determine whether these test results 1006 match expected results defined by the test scripts 1002. In this way, proper operation of the system project 302 can be verified prior to deployment without the need to develop custom test scripts to debug the system project code.

In some test scenarios, test scripts 1002 can define testing sequences that are applied to the system project 302 as a whole in a holistic manner rather than to a specific control program or routine. For example, the project testing component 210 can execute test scripts 1002 that verify linkages or relationships across design platforms—e.g., control code, visualization applications, electrical drawings, panel layout definitions, wiring schedules, piping diagrams, etc.—that may otherwise not be tested.

If the test results 1006 indicate an improper operation of one or more aspects of system project 302, project testing component 210 may generate and render one or more design recommendations 1008 indicating possible modifications to the system project 302 that would correct operation of the project. These design recommendations 1008 may include, for example, control code modifications or replacements, recommended corrections of data tag addresses, recommended corrections to HMI graphical object references, recommended corrections to mechanical or electrical drawings for consistency with the control code (e.g., to add a missing output device to an electrical drawing corresponding to an output device referenced by the control programming), recommended modifications to an industrial device's configuration parameters, or other such corrections.

The testing properties of some automation objects 222 may define multiple test scenarios 1004 that should be run on the object 222 and its corresponding control code and project elements to ensure comprehensive testing of the object 222 and related code. These scenarios 1004 are based on pre-learned industrial expertise relating to the industrial asset or process represented by the automation objects and its related project elements. In some implementations, each defined test scenario 1004 may have its own associated test script 1002, or may define a particular way to apply the test script 1002 (e.g., which routines of the system project's control code to validate, which other project elements should be cross-referenced for validation purposes, etc.). During testing of the system project 302, project testing component 210 can execute the one or more test scripts 1002 in accordance with each defined test scenario 1004 in sequence in order to comprehensively validate proper operation of the system project 302 across all platforms (control programming, visualization configuration, drawings, device configurations, etc.).

In some embodiments, project testing component 210 can also be configured to generate a validation checklist based on analysis of the system project 302, and output this validation checklist via the user interface component 204. This validation checklist can provide instructions regarding on-site tests and checks that should be performed in connection with commissioning the automation system for which system project 302 is being developed. These may comprise tests that should be performed on the automation system hardware and electrical connections that cannot be performed via testing of the system project 302 alone. Example validation checklist may include lists of I/O points whose connectivity should be verified, instructions to visually inspect panel-mounted equipment, sequences of manual operator panel interactions that should be performed to verify proper machine operation, or other such information.

Returning to FIG. 9, an automation object 222 can also include, as an attribute, a historian configuration that defines data generated by the corresponding industrial asset that is to be archived in a data historian. This historian configuration can be referenced by a data historian system or application that executes a portion of the system project 302 to facilitate configuring the data historian system to collect and archive the data items defined by the configuration. As with other attributes of the automation object 222, the historian configuration attribute can specify a subset of the available data generated by the corresponding industrial asset that is known to be relevant to assessments of the asset's performance or health, based on relevant industry expertise encoded into the object 222.

Some embodiments of the automation object 222 can also define security features or protocols associated with the associated industrial asset. These security features can include, but are not limited to, definitions of user roles that are permitted to perform certain actions relative to the industrial asset, encryption protocols that are to be applied to data generated by the asset, network security protocols to be enforced for the asset, or other such security features. The security information defined by these embodiments of the automation object 222 can be used by the system project 302 to regulate access to specified functions of the industrial asset (e.g., as a function of user role), to configure network devices to support the specified network security protocols, or to configure other security-related devices.

Figure 11:
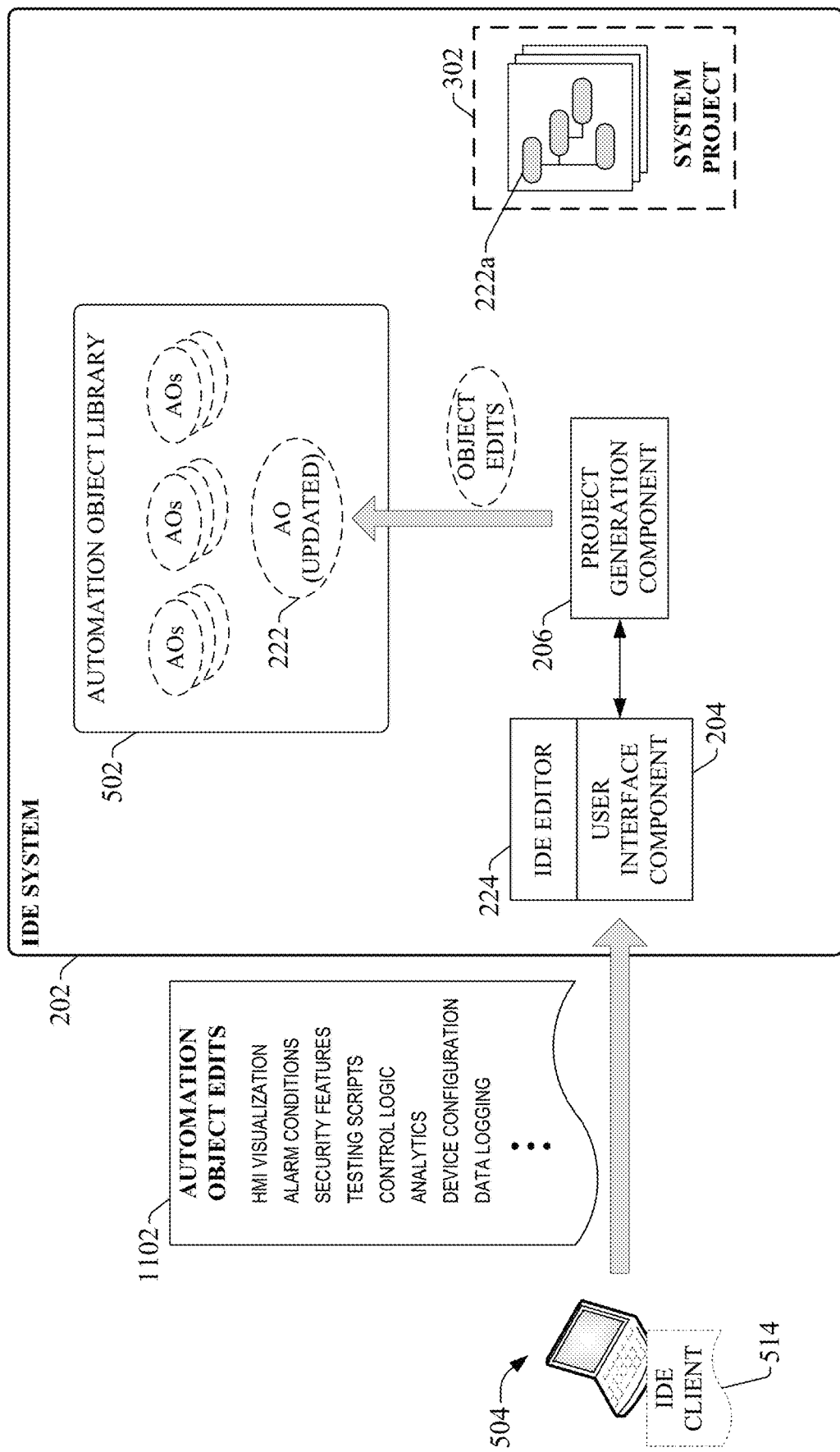
FIG. 11 is a diagram illustrating submission of automation object edits to an IDE system.

Embodiments of the IDE system 202 can support a development architecture whereby changes made to an automation object 222 stored in the automation object library 502 are propagated to instances of that automation object 222 that are used in a system project 302. FIG. 11 is a diagram illustrating submission of automation object edits 1102 to the IDE system 202. As noted above, automation objects 222 are maintained in an automation object library 502 (which may be part of memory 220). Via interaction with user interface component 204 and the associated IDE editor 224, developers can add selected automation objects 222 from the library 502 to a system project 302 as instances of these automation objects 222. In the example depicted in FIG. 11, object 222a is an instance of an automation object 222 that has been selected and added to the system project 302 by the developer. In some scenarios, the project generation component 206 may also automatically select and add automation objects 222 to the project 302 based on inferences about the automation system for which the project 302 is being developed (e.g., based on design goals or engineering drawings submitted to the system 202).

The IDE editor 224 can allow a user to modify attributes of selected automation objects 222 that are stored in the library 502. To this end, user interface component 204 can generate and deliver user interfaces to a client device 504 (e.g., via an IDE client 514) that allow the user to browse the available automation objects 222 and submit edits 1102 to selected objects 222. Any of the attributes described above in connection with FIG. 9 can be modified in this manner for any of the defined automation objects 222. For example, a designer may wish to modify the control code associated with a particular industrial asset (e.g., a pump, a tank, a stamping press, etc.) having a defined automation object 222 stored in the library 502. Accordingly, the user can submit edits 1102 directed to the associated automation object 222 that update the control code. Such edits can be used to update the operating sequence or control behavior for the associated industrial asset.

Similarly, the user may submit edits 1102 to update the visualization properties of a selected automation object 222; e.g., to replace or edit a graphical representation of the corresponding asset. Edits 1102 can also be submitted to add alarms to, or remove alarms from, the alarm definition list associated with an object 222, or to edit existing alarm definitions. The security features, test scripts, and analytic code associated with an automation object 222 can also be modified by submitting appropriate edits 1102.

These edits 1102 are directed to the automation object definitions maintained in the automation object library 502. Upon receipt of object edits 1102 directed to a selected automation object 222 (submitted via user interface component 204), the project generation component 206 updates the target automation object 222 in accordance with the received edits 1102 to yield an updated automation object 222. This updated automation object 222 replaces the previous version of the automation object 222 in the library 502.

Figure 12:
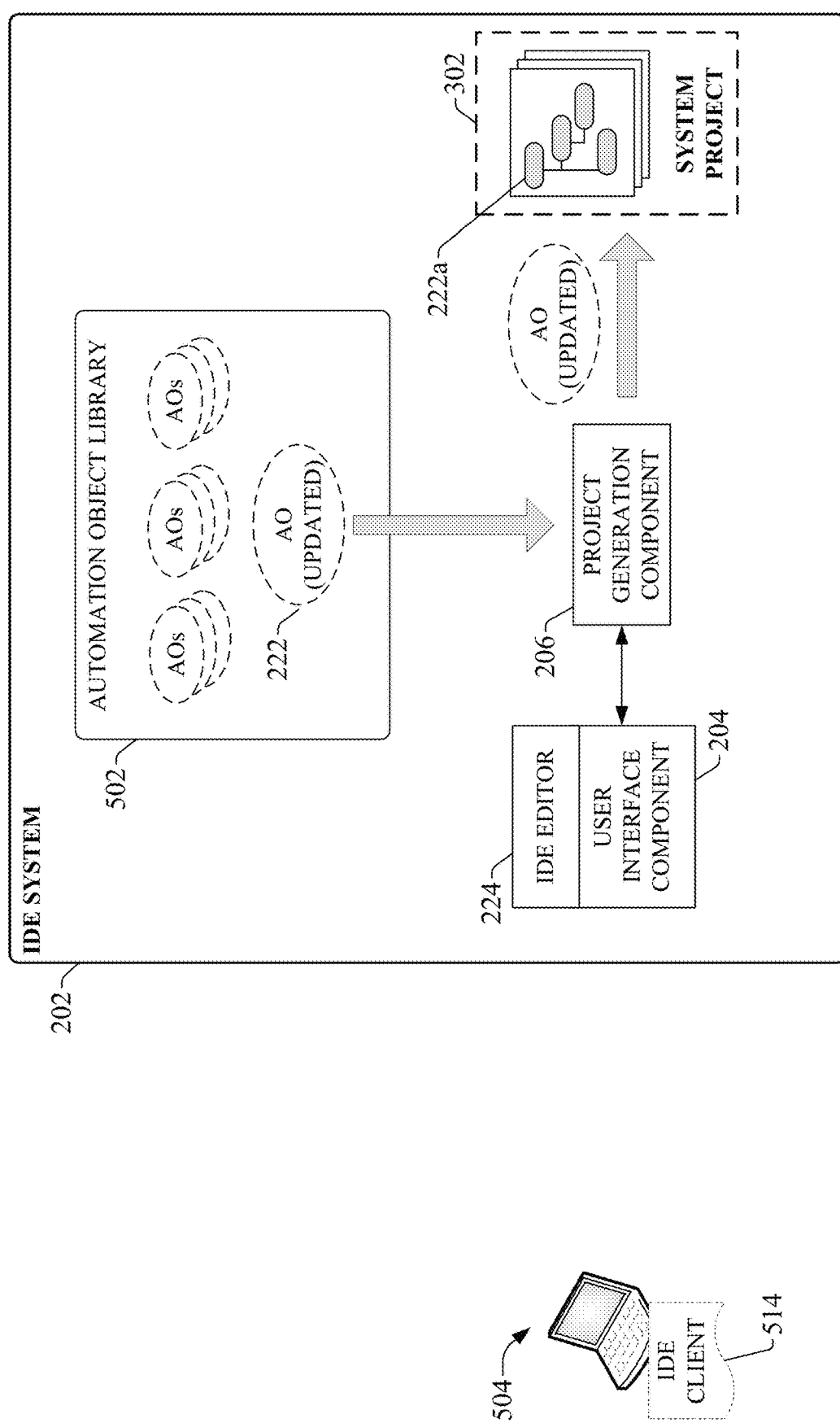
FIG. 12 is a diagram illustrating modification of instances of an automation object in accordance with edits submitted to the master version of the automation object stored in a library.

If instances of the automation object 222 that was subject to the edits 1102 had been added to an existing system project 302 before the edits 1102 were received, project generation component 206 can also update all instances of the automation object 222 found within the project 302. FIG. 12 is a diagram illustrating modification of instances of an automation object 222a in accordance with edits 1102 submitted to the master version of the automation object 222 stored in the library 502. When an automation object 222 in library 502 has been modified as described above, the project generation component 206 identifies all instances of the automation object 222a used throughout any system project 302 that uses or references the object 222, and propagates the modifications to these instances. This can include updating the control code, visualizations, analytics code, security features, or other attributes to reflect the modifications defined by the edits 1102. In this way, all instances of an automation object 222a automatically inherit modifications made to the master version of the automation object 222 stored in the library 502.

Figure 13:
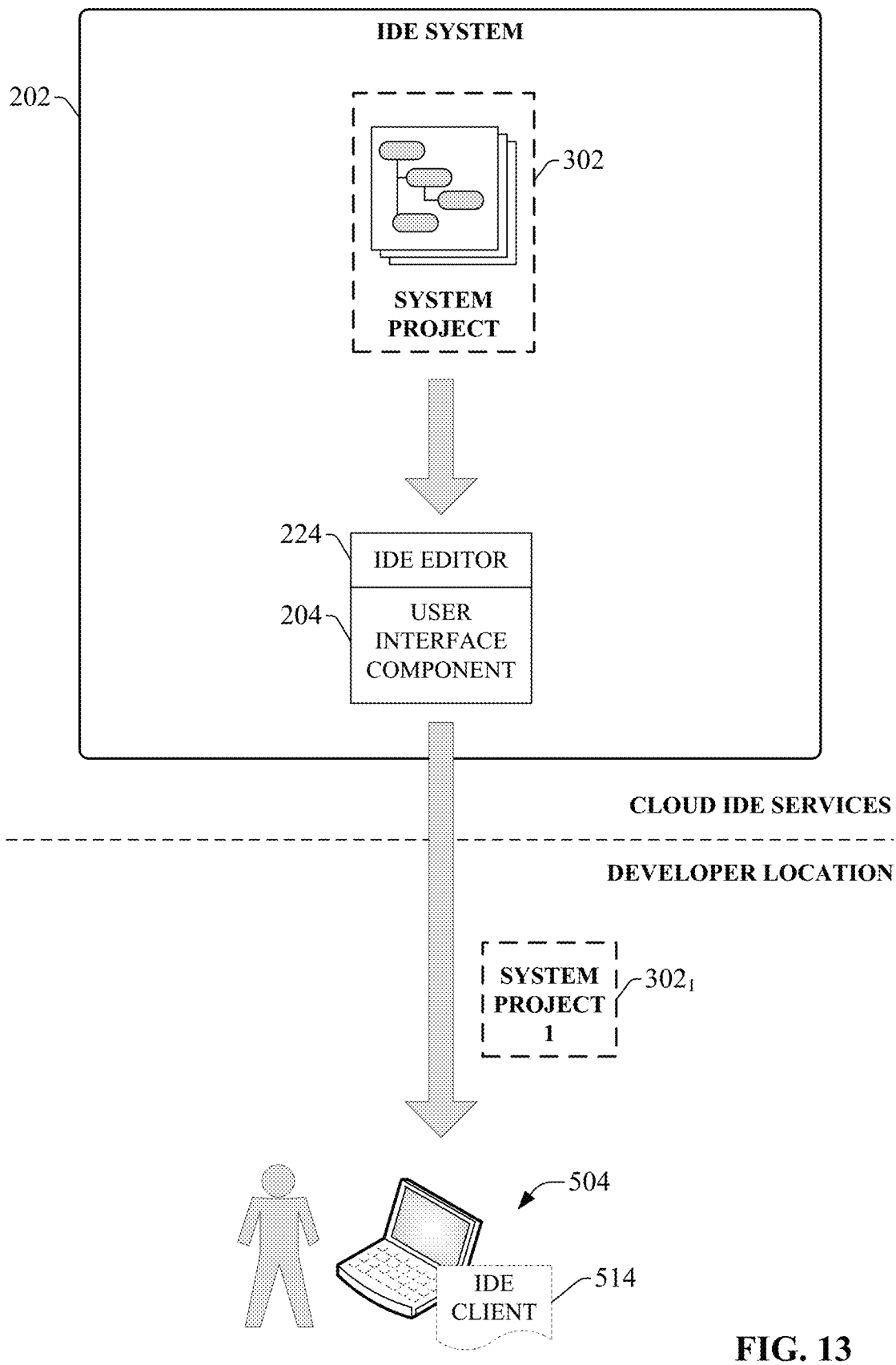
FIG. 13 is a diagram illustrating downloading of a copy of a system project from an industrial IDE system to a local client device.

FIG. 12 depicts an example scenario in which the system project 302 is stored on the IDE system 202 itself (e.g., on cloud-based storage if the IDE system 202 is implemented as a cloud service, as depicted in FIG. 8). However, in some embodiments, the IDE system 202 can also propagate automation object edits to system projects that have been deployed to local client devices for local editing. FIG. 13 is a diagram illustrating downloading of a copy of system project 302 from IDE system 202 to a local client device 504. In this example, client device 504 executes an IDE client 514 that allows the client device 504 to access the IDE system's project development tools and environment. The IDE client 514 can be served to the client device 504 by the IDE system 202 or may be a client application installed on client device 504 and configured to interface with the IDE system 202. A user can interact with the IDE client 514 to copy a version $302_1$ of system project 302 from the cloud-based IDE system 202 to the client device's local storage for local viewing and development. The master copy of the system project 302 is maintained on the IDE system 202 after the local version $302_1$ has been copied.

Once copied to the client device 504, a developer can view and edit the local version $302_1$ using project development tools supported by the IDE client 514. At least some of these development tools can be similar to those supported by the IDE system 202 described above (see, e.g., FIG. 5). For example, some embodiments of IDE client 514 can support the use of design guardrails to ensure that local edits made to the local version $302_1$ of the project—e.g., control program changes, HMI modifications, changes to device configuration parameters, modifications to automation objects, etc.—comply with internal or external design standards. As in previous examples, various embodiments of IDE client 514 can allow the user to submit edits to the local version $302_1$ of the project as one or more of control programming (e.g., ladder logic, DLS programming, sequential function charts, structured text, function block diagrams, etc.), design changes to visualization applications such as HMIs (e.g., addition, removal, or relocation of graphical objects), industrial device configuration parameter values, or other such design input.

In an example scenario, a developer may choose to modify an existing system project 302 in order to adapt the project 302 for deployment on an automation system having characteristics that deviate from a typical installation, and which necessitate modifications to the system project 302. For example, the system project 302 may be designed to program and configure a type of standardized automation system built to carry out a particular industrial function, and which is installed at multiple locations or facilities of an industrial enterprise. A new installation of this automation system may deviate from standard installations of the system in a number of ways, including but not limited to replacement of one or more devices of the automation system with devices provided by an alternative vendor, addition or omission of a workstation, installation modifications to accommodate physical constraints of the installation location, special control requirements that deviate from standard requirements (e.g., differences in product design, control modifications to accommodate differences in materials or parts used to manufacture the product), or other such deviations. In order to accommodate these changes, the developer may download a local version $302_1$ of the system project 302 and implement the necessary modifications on the local version $302_1$.

Figure 14:
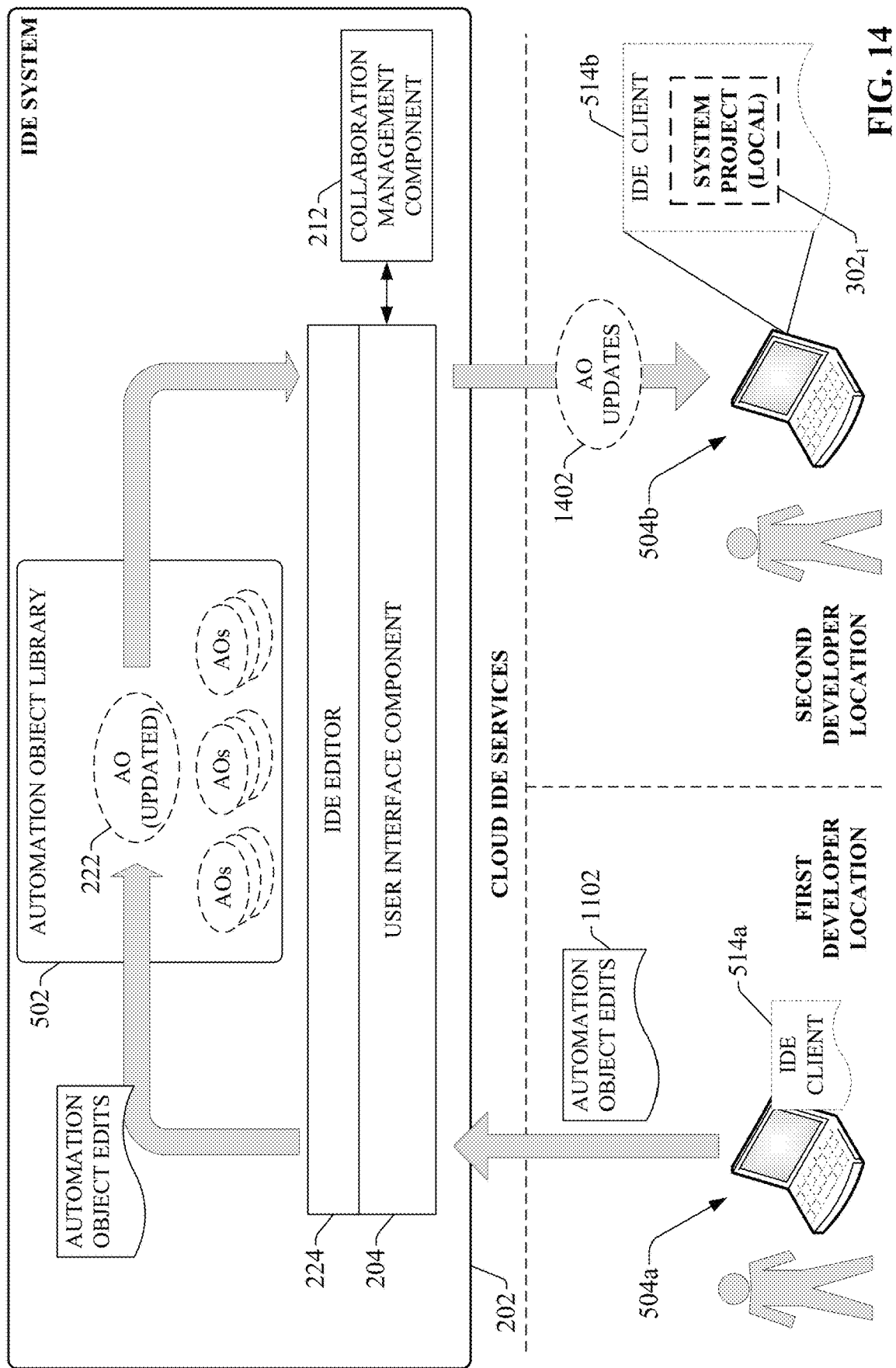
FIG. 14 is a diagram illustrating propagation of automation object edits to a locally stored copy of a system project.

FIG. 14 is a diagram illustrating propagation of automation object edits to a locally stored copy of a system project 302. In this example scenario, a user at client device 504b has downloaded a local version $302_1$ of a system project 302 as described above in connection with FIG. 13. The automation object library 502 containing the master versions of automation objects 222 remains stored on the cloud platform in association with the IDE system 202. As such, any authorized developer can access the automation library 502 to not only add selected automation objects 222 to a system project 302, but also to modify selected automation objects 222 as part of development of a project, or to reflect modifications to the corresponding industrial assets represented by the objects 222. In the example illustrated in FIG. 14, a developer at client devices 504a submits a set of edits 1102 directed to a selected automation object 222 stored on the library 502 (e.g., to update the object's control code, visualization representation, testing scripts, etc.). In response to receipt of these edits 1102, the project generation component 206 (not shown in FIG. 14) updates the master version of the selected automation object 222 stored in the library 502 in accordance with the edits 1102.

Moreover, when the edits have been implemented on the selected automation object 222, the project generation component 206 also identifies all locally stored and remotely stored versions of any system projects 302 that have incorporated instances of the selected automation object 222. This includes identifying any system projects 302 stored on cloud storage in association with the IDE system 202, as well as any versions $302_1$ of the system project 302 that had been downloaded to local client devices (e.g., client device 504b) for local development. In this regard, a collaboration management component 210 may track all instances of a system project 302 that have been downloaded to local client devices so that these local versions of the project 302 can be updated as needed in response to modifications submitted to the cloud-based IDE system 202.

In response to submission of the object edits 1102 and corresponding modification of the master version of the automation object 222 to which the edits 1102 are directed, the project generation component 206 also distributes automation object updates 1402 to all IDE clients 514b on which are stored local versions $302_1$ of a system project 302 that uses the automation object 222. The updates 1402 reflect the automation object edits 1102 that were submitted by the developer using client device 504a and, when executed by the local IDE client 514b, update all instances of the automation object 222 in accordance with the edits 1102. In this way, updates to an automation object 222 on the object library 502 are automatically broadcast to all instances of the object 222 that are currently used in system projects 302.

In some embodiments, a local developer at client device 504b may be afforded the option to allow the updates 1402 to be incorporated into their local version 3021 of the system project 302, or to decline implementation of the updates 1402. Accordingly, before updating the local versions of the automation object 222, the user interface component 204 may render information about the object edits 1102 on the user's client device 504b, and can also render a prompt for approval from the developer to implement the edits locally. The information about the edits 1102 can comprise, for example, an identity of the automation object 222 that is affected by the edits and a summary of each modification to the object 222 that will be implemented by the edit (e.g., indications of which object attributes will be modified, and how these attributes will be changed). Based on a review of these edits, the local developer may select to implement the updates 1402 on their local version $302_1$ or, alternatively, to deny the edits and prevent updates 1402 from being implemented on their local version $302_1$ of the project 302.

Figure 15:
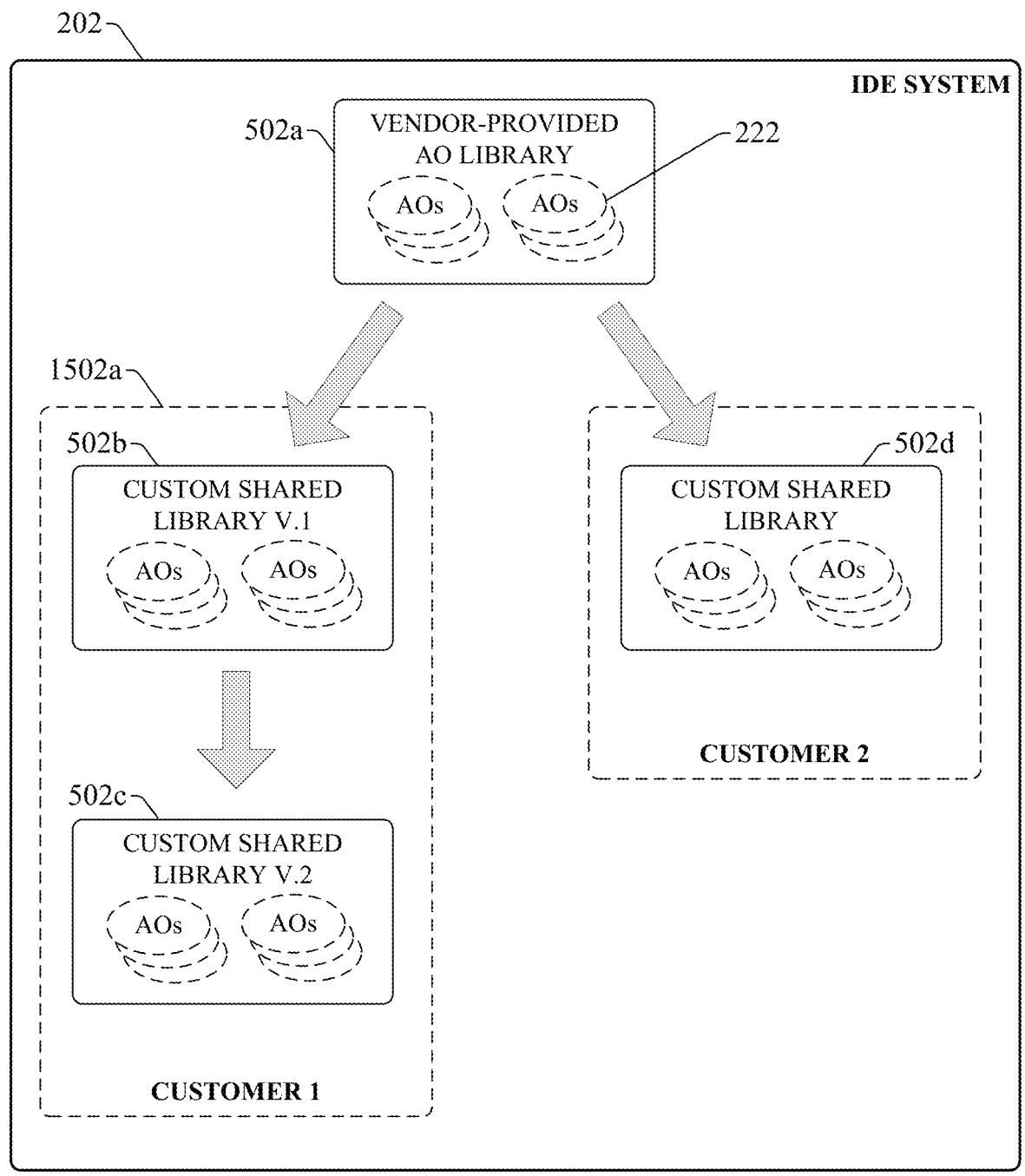
FIG. 15 is a diagram illustrating creation of multiple shared automation object libraries that can each be accessed by multiple system projects.

Automation object library 502 acts as a shared library that can be accessed by multiple different system projects 302, and that allows those projects 302 to reference its stored objects 222. Some embodiments of IDE system 202 can support creation of multiple shared libraries that can be cross-shared across multiple system projects 302. FIG. 15 is a diagram illustrating creation of multiple shared automation object libraries 502 that can each be accessed by multiple system projects 302. Although the example shared libraries described herein are depicted as automation object libraries 502, some embodiments of the IDE system 202 can support creation of multiple instances of other types of libraries, including but not limited to code module libraries, visualization element libraries, or other libraries of project design components.

In addition to a common shared library 502a that is made available by the IDE service provider to all authorized customer entities, IDE system 202 allows customer entities or users to create their own custom shared libraries 502 and to reference these shared libraries from their own system projects 302. In the example depicted in FIG. 15, two customer entities—Customers 1 and 2—access the IDE system's development tools to create one or more customer-specific shared libraries 502. In some scenarios, developers associated with a given customer entity can create a new custom library (e.g., library 502b for Customer 1 or library 502d for Customer 2) by modifying or building upon an existing library. In the example depicted in FIG. 15, Customers 1 and 2 have each created a custom shared library 502b and 502d, respectively, based on the common shared library 502a. A developer may, for example, create a custom shared library 502b that comprises many of the same automation objects 222 that are available in the common shared library 502a, but which modifies selected attributes of one or more of the objects 222 relative to the vendor-provided versions (e.g., via submission of automation object edits 1102 as discussed above in connection with FIG. 11). In another example, a developer may create a custom shared library 502b that expands the set of automation objects 222 that are available in the common shared library 502b by adding new custom objects 222 that represent custom or proprietary industrial assets that are in service at the customer's plant facility.

In the example depicted in FIG. 15, Customer 2 has created a single custom shared library 502d, while Customer 1 has created two different custom shared libraries 502b and 502c. The first custom shared library 502b has been created as a modified version of the vendor-provided shared library 502a. The second custom shared library 502c has been created as a modified version of the first custom shared library 502b; e.g., by modifying attributes of one or more objects 222 stored in the first custom library 502b or by adding new custom objects 222 to the set of objects available in the first custom library 502b. Any number of custom shared libraries 502 can be created in this manner for a given customer entity, and each shared library 502 can be referenced by one or more system projects 302 that are either stored on the cloud platform on which the IDE system 202 executes or stored locally on client devices 504 that remotely access the IDE services. The system 202 allows developers to set the scope of each custom library 502, such that access to a custom shared library 502 can be regulated according to industrial enterprise, plant facility, user role, or individual user identities.

FIG. 16 is a diagram illustrating cross-sharing of shared libraries 502 according to one or more embodiments. In general, a system project 302 being developed using the IDE system 202 can reference any number of shared libraries 502 that have been created as described above in connection with FIG. 15. In the example depicted in FIG. 16, local versions of two different system projects 302a and 302b are being developed on respective two client devices 504a and 504b. These local versions may comprise copies of respective system projects 302 that have been downloaded from the IDE system 202 for local development, as described above in connection with FIG. 13. Each system project 302a and 302b is permitted access to one or more of the shared libraries 502 on IDE system 202, as defined by a shared library mapping 1602 associated with each project 302. A project's shared library mapping 1602 defines which shared libraries 502 the project 302 is permitted to access, such that developers can select and incorporate objects from those shared libraries into the system project 302.

If a system project 302 references a shared library 502, as defined by the project's shared library mapping 1602, the IDE system 202 will deliver notifications to the project 302 to alert the project developer of edits, additions, or updates that have been submitted to the shared library 502. In an example scenario, the user interface component 204 will render an edit notification on the project 302 when another user submits an edit to the content of the shared library 502, as discussed above in connection with FIG. 14. These edits can comprise, for example, edits to one or more attributes of automation objects 222, or edits to code modules, stored in the shared library 502. The edit notification can display, within the IDE development environment rendered on the recipient's client device 504, information about the edit, including an identity of the automation object 222 that has been modified, a summary of which object attributes have been modified (including the new values of the attributes), an identification of the shared library in which the affected automation object resides, or other such information. In some embodiments, the edit notification may also include design notes that were attached to the edit 1102 by the developer who submitted the edit 1102. These design notes can be used to convey the developer's reason for the edit, an explanation of design scenarios in which the edited object 222 should be used, or other such information.

In some embodiments, the collaboration management component 212 may also analyze the recipient's system project 302 in view of the object edit to determine possible impacts on the recipient's system project 302—or impacts on operation of the automation system to be monitored and controlled by the project 302—if the edit were to be propagated to instances of the object within the project 302. The edit notification can include a summary of these possible impacts for review by the user. This analysis may determine, for example, whether implementation of the edit will negatively impact, or improve, a key performance indicator of the system project 302 (e.g., product throughput, machine downtime, device lifecycle, energy consumption, etc.).

In some embodiments, the edit notification can take the form of a graphical icon—e.g., a colored dot or other shape—superimposed on or near a graphical representation of the instance of the affected automation object within the user's system project 302. The graphical icon can convey to the user that the corresponding master copy of the automation object 222 has been edited in the shared library 502, and that the user has the option to synchronize the edits to their system project 302. In such embodiments, selection of the graphical icon can cause the user interface component 204 to render the information about the object edit discussed above; e.g., on a summary window superimposed on or near the graphical representation of the object instance.

In response to receipt of the edit notification, the recipient can elect to either allow the corresponding object updates 1402 to be propagated to instances of the affected object within the recipient's own system project 302, or to decline implementation of the updates 1402 within their project 302, as discussed above in connection with FIG. 14. In some embodiments, the system 202 can allow the recipient to partially or selectively implement the object updates 1402 by opting to propagate the updates 1402 only to a selected subset of instances of the affected object within the recipient's project 302. In this way, the IDE system 202 supports instantiation of multiple different versions of a given automation object 222 within a system project 302.

The user interface component 204 can also deliver notifications to projects 302 that reference a shared library 502 when new objects or code modules are added to the library 502 by other developers. These notifications can include information about the newly added object 222, including but not limited to an industrial asset represented by the new object 222, key attributes associated with the object 222, design scenarios in which the new object 222 is intended to be used, or other such information.

In some embodiments, the user interface component 204 can render the library update notifications described above in a browsable format. For example, if updates are available for one or more of the shared libraries 302 referenced by a developer's system project 302, the IDE development interface may display an icon indicating that the user's project 302 is not synchronize with one or more of the shared libraries 502. Selection of this icon can render a list of the shared libraries 502 that are referenced by the project 302 and which have updates that have not been synchronized to the developer's project 302. The user interface component 204 can allow the user to browse the available updates via interaction with this list; e.g., by selecting a library from the list to render the updates that are available in that library 502. The user can then review these pending library updates 1402 and select which of the updates 1402 are to be synchronized to the user's own project 302. In the case of automation object updates, the user can further opt, for each object update, either to apply the update 1402 to all instances of the affected automation object 222 or to apply the update to a selected subset of instances within the project 302. In this way, the IDE system 202 affords the user a high degree of granularity with regard to synchronization of edits submitted to shared libraries 502.

Although the example shared library architecture illustrated in FIG. 16 depicts cross-sharing of libraries 502 by system projects 302 that are stored locally on client devices 504 for local development, the shared library features described above are also applicable in scenarios in which the system projects 302 are stored on cloud storage for remote collaborative development.

Some embodiments of IDE system 202 can also allow developers to create personal library content derived from existing content of shared libraries 502. As described above with reference to FIG. 15, developers can create a custom library as a modified version of a shared library 502. Although FIG. 15 depict the resulting new libraries as being sharable libraries that can be referenced by multiple authorized projects 302, the IDE system 202 can also allow a developer to create a personal custom library in this manner, such that the personal library can be referenced only by the developer's own system project 302.

Personal custom libraries can be created in a number of different ways. For example, as discussed above in connection with FIG. 15, a custom library can be created by modifying attributes of one or more objects 222 stored in an existing shared library 502 or by adding new custom objects 222 to the set of objects available in the shared library, and saving the resulting modified library 502 as a new custom library (leaving the original shared library unmodified). The resulting custom library can be set to be a sharable library or can be saved as a personal library referenced only by the developer's own system project 302.

Custom personal libraries can also be created based on the content of a user's system project 302 if the objects present in the project 302 deviate from those available in existing shared libraries 502. For example, when a first developer whose project 302 references a shared library 502 declines to synchronize edits 1102, or opts to only partially synchronizes edits 1102, that were submitted to the shared library 502 by a second developer, instances of the library's automation objects 222 used in the first developer's project 302 no longer match the corresponding objects 222 available in the shared library 502. Similarly, a user may apply a local edit to an automation object 222 used within the system project 302, creating a new version of that object 222 that is not found in an existing library 502. In such scenarios, the first developer can submit an instruction to the IDE system 202 to create a new personal custom library 502 comprising the set of automation objects 222 currently being used in the developer's project 302, including those that are no longer synchronized with the original shared library 502 from which these objects 222 were imported. Upon receipt of this instruction, the IDE system 202 creates the new personal library 502 and maps the new library 502 to the developer's project 302, such that new library 502 remains bound to the project 302. If desired, the developer can also set the new library 502 to be a shared library, allowing the library to be accessed by other system projects 302.

Figure 17A:
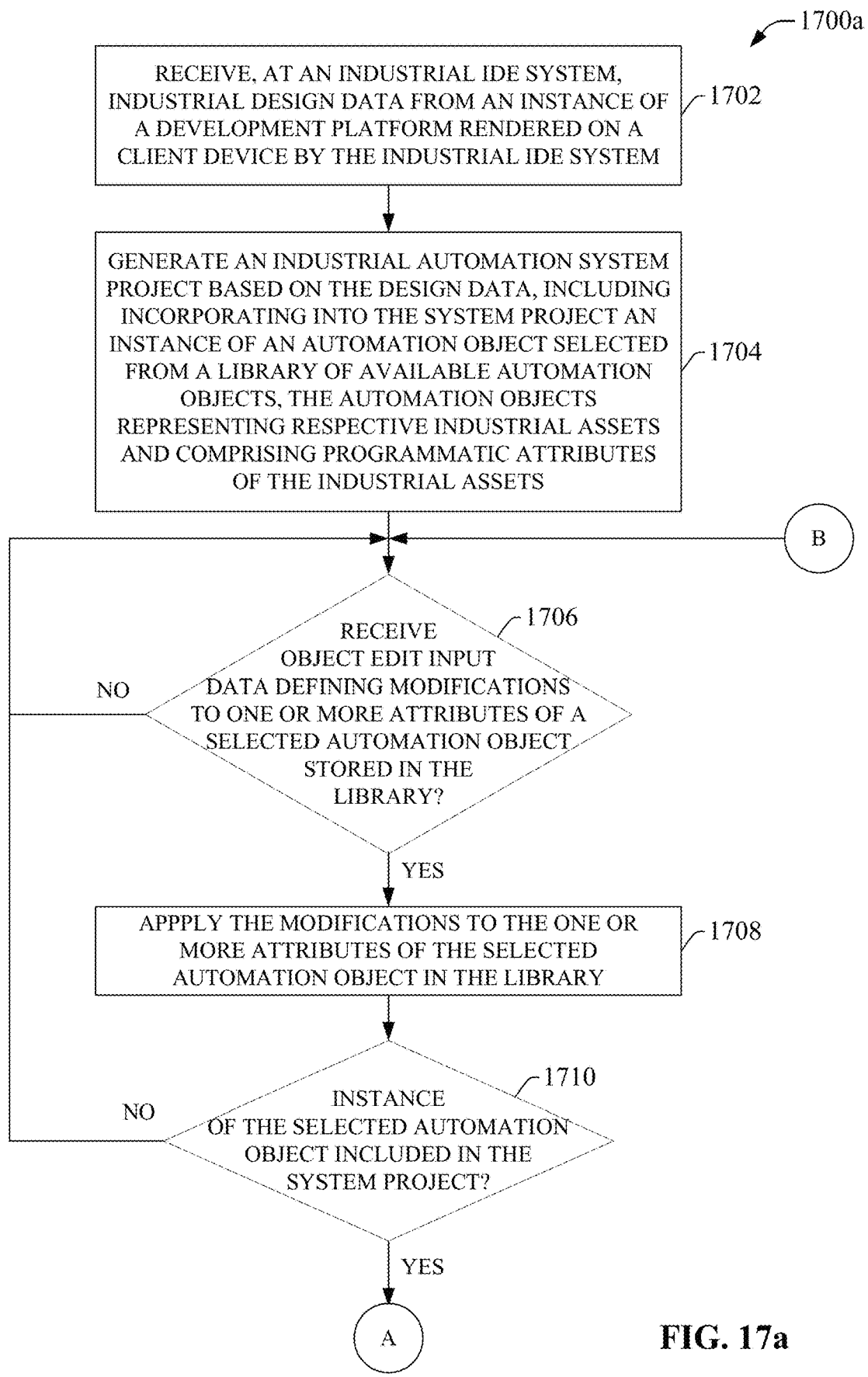
FIG. 17a is a flowchart of a first part of an example methodology for propagating edits to an automation object to instances of the object used in one or more system projects.
Figure 17B:
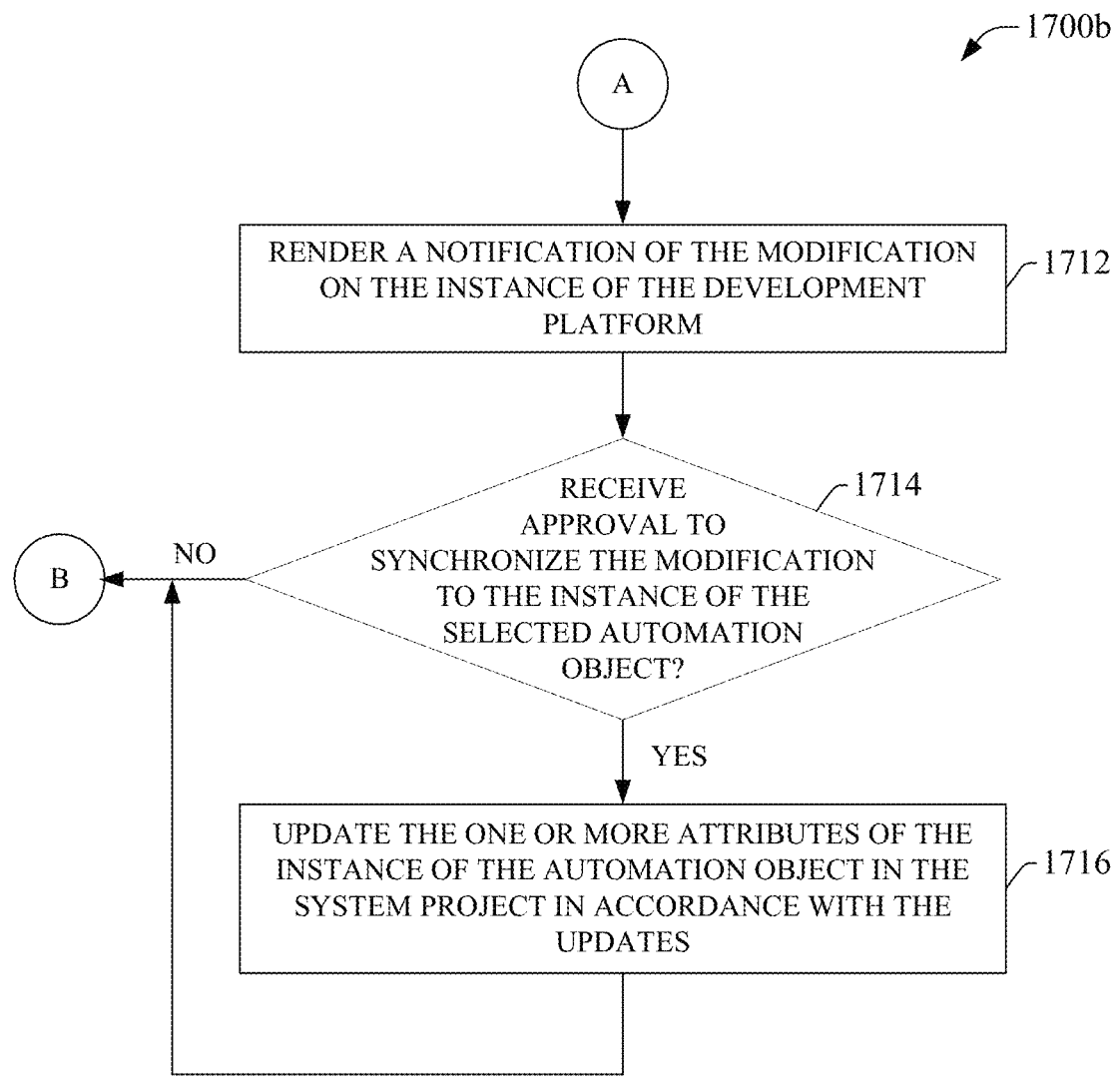
FIG. 17b is a flowchart of a second part of the example methodology for propagating edits to an automation object to instances of the object used in one or more system projects.

FIGS. 17a-17b illustrate a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 17a illustrates a first part of an example methodology for propagating edits to an automation object to instances of the object used in one or more system projects. Initially, at 1702, industrial design data is received at an industrial IDE system from an instance of a development platform rendered on a client device by the industrial IDE system. The industrial design data can be submitted in the form of one or more of industrial controller programming (e.g., ladder logic, sequential function charts, scripted control code such as an industrial DSL, etc.), HMI screen development input, industrial device or equipment selections, engineering drawing input, etc. In some embodiments, the industrial design data can also include completed engineering drawings (e.g., P&ID drawings, electrical drawings, mechanical drawings, etc.), which can be parsed and analyzed by the industrial IDE to identify components of the industrial automation system being designed (e.g., industrial devices, machines, equipment, conduit, piping, etc.) as well as functional and physical relationships between these components.

At 1704, an industrial automation system project is generated based on the design data received at step 1702. As part of the project generation process, at least one instance of an automation object selected from a library of available automation objects can be included in the project. The automation objects are building blocks for the industrial automation system project and represent various types of real-world industrial assets or processes, including but not limited to pumps, tanks, values, motors, motor drives (e.g., variable frequency drives), industrial robots, actuators (e.g., pneumatic or hydraulic actuators), or other such assets. The automation objects are associated with various attributes or properties as a function of their represented asset or process (e.g., control code, visualization objects or interfaces, test scripts, security features or protocols, etc.).

The automation system project comprises one or more executable files that can be deployed and executed on at least one of an industrial control device (e.g., a PLC or another type of industrial control device), a human-machine interface terminal, or another type of industrial device. These files can include, for example, industrial control programming files, visualization application files, device configuration files, or other such executable or configuration components, at least some of which are generated based on any automation objects included in the project. The automation system project can also comprise other engineering documents generated by the IDE system based on the design input, including but not limited to engineering drawings (e.g., I/O drawings, electrical drawings, P&ID drawings, etc.), bills of materials, installation instructions, or other such documents.

At 1706, a determination is made as to whether object edit input is received defining modifications to one or more attributes of a selected automation object stored in the automation library. The edit input may define a modification to one or more of the control code, visualization definitions, testing scripts, security protocols, or other attributes of the object. The edit may be received from another instance of the development platform with authorization to access the library of automation objects. In this regard, the automation object library serves as a shared library that can be accessed by multiple system projects as a source of vendor-provided or user-defined automation objects. If object edit input is received (YES at step 1706), the methodology proceeds to step 1508, where the modifications are applied to the one or more attributes of the selected automation object in the library.

At 1710, a determination is made as to whether an instance of the selected automation object that was modified at step 1708 is included in the automation system project generated at step 1704. If no instance of the modified automation object is found in the automation system project (NO at step 1710), the methodology returns to step 1706. Alternatively, if an instance of the modified automation object is found in the automation system project (YES at step 1710), the methodology proceeds to the second part 1700*b* illustrated in FIG. 17*b*.

At 1712, a notification is rendered on the instance of the development platform notifying of the modification to the automation object. The notification can include information about the modification, including but not limited to an identity of the automation object that was modified, indications of which object attributes were modified, locations within the automation system project at which the affected automation object is currently being used, an estimated impact on operation of the automation system project if the modifications were to be propagated to the instances of the object within the automation system project, or other such information.

At 1714, a determination is made as to whether approval is received from the instance of the development platform to synchronize the object modification to the instance of the selected automation object within the automation system project (that is, to apply the edits received at step 1706 to the local instance of the modified automation object). If no such approval is received (that is, a user of the development platform declines to apply the edits to the local automation system project) (NO at step 1714), the methodology returns to step 1706. Alternatively, if approval to synchronize the modification is received (YES at step 1714), the methodology proceeds to step 1716, where the one or more attributes of the automation object that were modified by the edit input are updated in the instance of the automation object within the automation system project. In some embodiments, if multiple instances of the automation object are incorporate into the automation system project, the user can opt to apply the modifications only to a selected subset of the instances of the automation object, resulting in multiple versions of the object within the project.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 18:
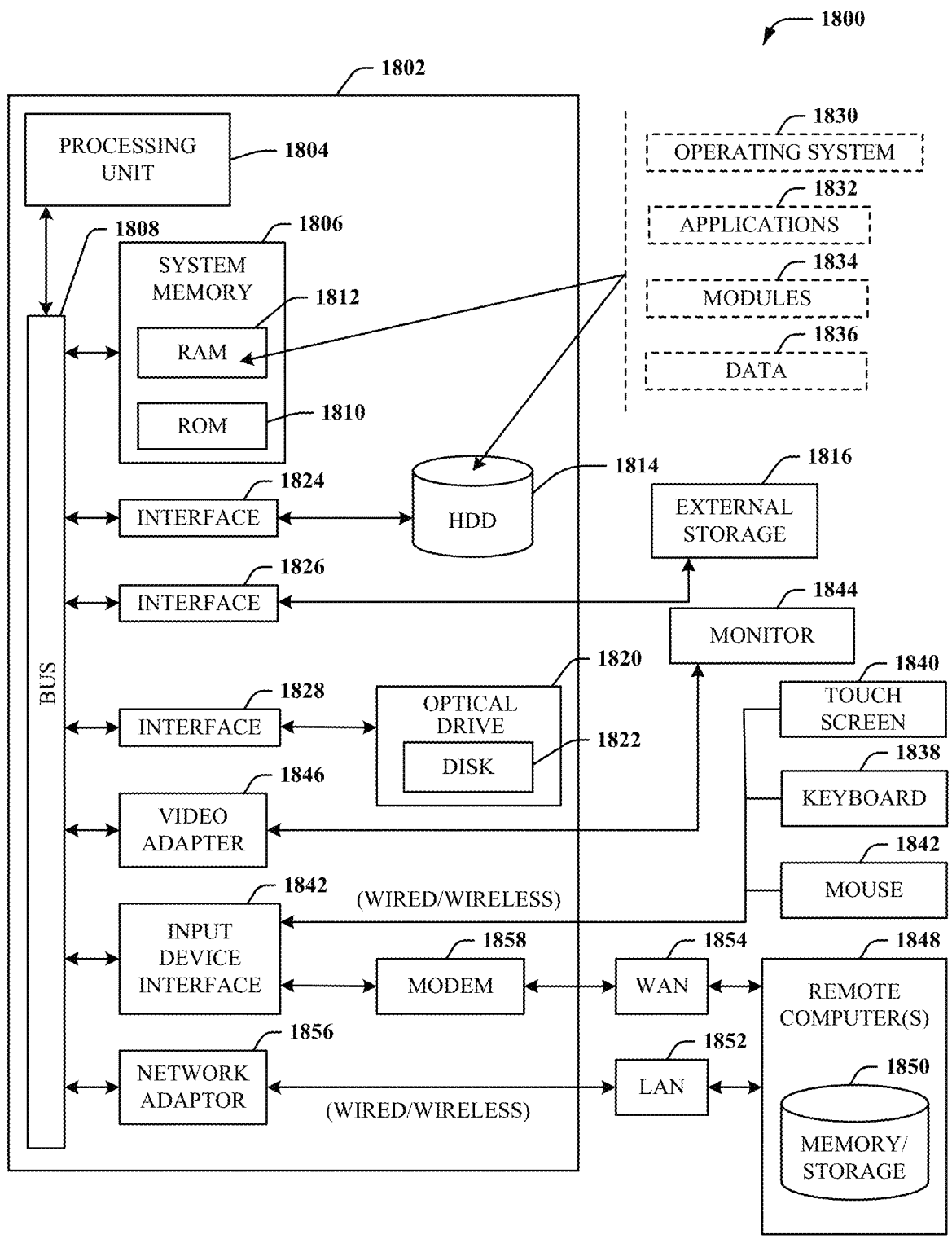
FIG. 18 is an example computing environment.
Figure 19:
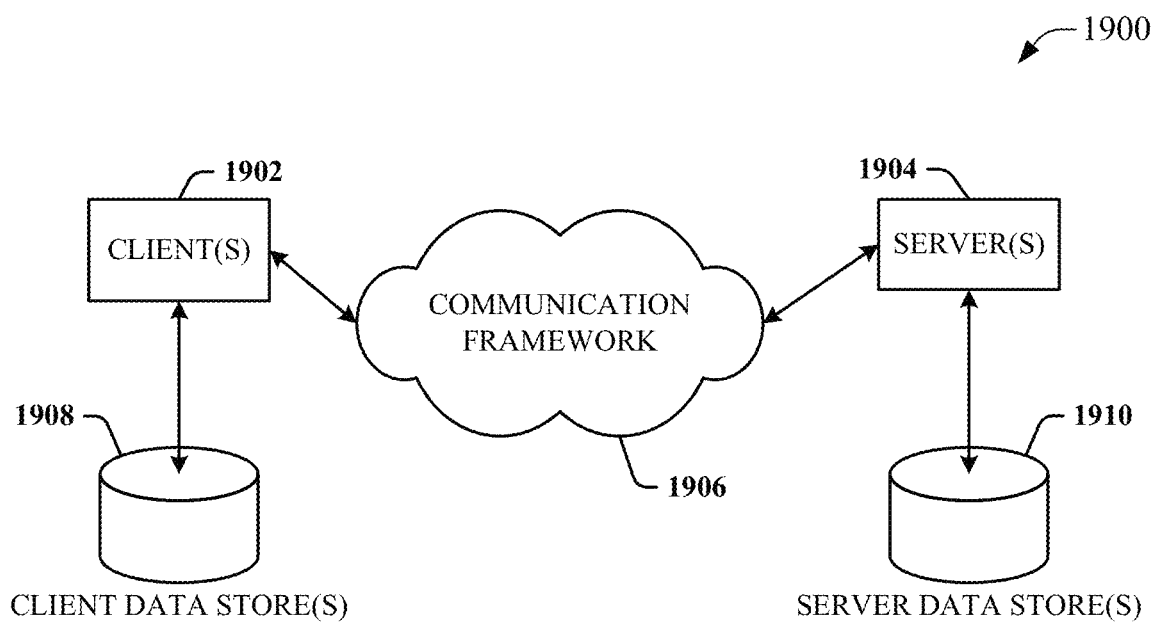
FIG. 19 is an example networking environment.

In order to provide a context for the various aspects of the disclosed subject matter, FIGS. 18 and 19 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and an optical disk drive 1820 (e.g., which can read or write from a CD-ROM disc, a DVD, a BD, etc.). While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and optical disk drive 1820 can be connected to the system bus 1808 by an HDD interface 1824, an external storage interface 1826 and an optical drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for application programs 1832. Runtime environments are consistent execution environments that allow application programs 1832 to run on any operating system that includes the runtime environment. Similarly, operating system 1830 can support containers, and application programs 1832 can be in the form of containers, which are lightweight, standalone, executable packages of software that include, e.g., code, runtime, system tools, system libraries and settings for an application.

Further, computer 1802 can be enable with a security module, such as a trusted processing module (TPM). For instance with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1844 or other type of display device can be also connected to the system bus 1808 via an interface, such as a video adapter 1846. In addition to the monitor 1844, a computer typically includes other peripheral output devices (not shown), such as speakers, printers, etc.

The computer 1802 can operate in a networked environment using logical connections via wired and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wired/wireless connectivity to a local area network (LAN) 1852 and/or larger networks, e.g., a wide area network (WAN) 1854. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1852 through a wired and/or wireless communication network interface or adapter 1856. The adapter 1856 can facilitate wired or wireless communication to the LAN 1852, which can also include a wireless access point (AP) disposed thereon for communicating with the adapter 1856 in a wireless mode.

When used in a WAN networking environment, the computer 1802 can include a modem 1858 or can be connected to a communications server on the WAN 1854 via other means for establishing communications over the WAN 1854, such as by way of the Internet. The modem 1858, which can be internal or external and a wired or wireless device, can be connected to the system bus 1808 via the input device interface 1842. In a networked environment, program modules depicted relative to the computer 1802 or portions thereof, can be stored in the remote memory/storage device 1850. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above. Generally, a connection between the computer 1802 and a cloud storage system can be established over a LAN 1852 or WAN 1854 e.g., by the adapter 1856 or modem 1858, respectively. Upon connecting the computer 1802 to an associated cloud storage system, the external storage interface 1826 can, with the aid of the adapter 1856 and/or modem 1858, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 19 is a schematic block diagram of a sample computing environment 1900 with which the disclosed subject matter can interact. The sample computing environment 1900 includes one or more client(s) 1902. The client(s) 1902 can be hardware and/or software (e.g., threads, processes, computing devices). The sample computing environment 1900 also includes one or more server(s) 1904. The server(s) 1904 can also be hardware and/or software (e.g., threads, processes, computing devices). The servers 1904 can house threads to perform transformations by employing one or more embodiments as described herein, for example. One possible communication between a client 1902 and servers 1904 can be in the form of a data packet adapted to be transmitted between two or more computer processes. The sample computing environment 1900 includes a communication framework 1906 that can be employed to facilitate communications between the client(s) 1902 and the server(s) 1904. The client(s) 1902 are operably connected to one or more client data store(s) 1908 that can be employed to store information local to the client(s) 1902. Similarly, the server(s) 1904 are operably connected to one or more server data store(s) 1910 that can be employed to store information local to the servers 1904.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for developing industrial applications, comprising:
   a memory that stores executable components and shared libraries of automation objects representing respective industrial assets, the automation objects having respective programmatic attributes associated with the industrial assets; and
   a processor, operatively coupled to the memory, that executes the executable components, the executable components comprising:
      a user interface component configured to render integrated development environment (IDE) interfaces and to receive, via interaction with the IDE interfaces, design input that defines aspects of an industrial automation project; and
      a project generation component configured to generate system project data based on the design input, the system project data comprising instances of one or more of the automation objects stored in one or more of the shared libraries to which the system project is mapped,
   wherein
      the system project data defines a system project comprising at least one of an executable industrial control program, an industrial visualization application, or industrial device configuration data,
      the project generation component is configured to, in response to receipt of an edit to an automation object, of the automation objects, in one of the shared libraries:
         determine whether an instance of the automation object is included in the system project data,
         cause the user interface component to render, via one or more of the IDE interfaces, a notification indicating that the automation object has been edited in the one of the shared libraries, and
         in response to receipt, via interaction with one of the IDE interfaces, of a request to synchronize the edit, modify the instance of the automation object in the system project data in accordance with the edit.

2. The system of claim 1, wherein the notification comprises at least one of an identity of the automation object to which the edit is directed, an attribute of the automation object that is modified by the edit, or an identity of the library in which the automation object resides.

3. The system of claim 1, wherein the notification comprises a graphical icon superimposed on a graphical representation of the instance of the automation object within the system project.

4. The system of claim 1, wherein the project generation component is configured to, in accordance with requests received via interaction with one or more of the IDE interfaces, synchronize the edit to a selected first subset of instances of the automation object less than a total set of instances of the automation object included in the system project, and leave a remaining second subset of the instances of the automation object unmodified.

5. The system of claim 1, wherein the project generation component is further configured to, in response to receipt of an instruction via interaction with one of the IDE interfaces, create a custom library of automation objects as a modified version of one of the shared libraries.

6. The system of claim 5, wherein the project generation component is configured to, in accordance with the instruction, set the custom library as one of a shared library accessible to other system projects or a personal library accessible exclusively to the system project.

7. The system of claim 5, wherein the project generation component is configured to render the custom library accessible exclusively to other system projects associated with a same industrial enterprise as that of the system project.

8. The system of claim 1, wherein the system project is mapped to multiple libraries of the shared libraries.

9. The system of claim 1, wherein the edit modifies an attribute of the automation object, the attribute comprising least one of control code for monitoring and controlling an industrial asset represented by the automation object, a visualization object that defines a graphical visualization of the industrial asset, an alarm definition for the industrial asset, a security feature of the industrial asset, a security protocol of the industrial asset, a test script configured to validate operation of the automation object within the system project, or an analytic script configured to perform an analysis on data generated by the industrial asset.

10. The system of claim 1, wherein the automation objects represent, as the industrial assets, at least one of an industrial process, a controller, a control program, a tag within the control program, a machine, a motor, a motor drive, a telemetry device, a tank, a valve, a pump, an industrial safety device, an industrial robot, or an actuator.

11. A method for developing industrial applications, comprising:
   rendering, by a system comprising a processor and storing a shared library of automation objects representing respective industrial assets, integrated development environment (IDE) interfaces on a client device;
   receiving, by the system via interaction with the IDE interfaces, design input that defines aspects of an industrial control and monitoring project;
   generating, by the system, system project data based on the design input, the system project data comprising instances of one or more of the automation objects stored in the shared library of automation objects, wherein the automation objects have respective programmatic attributes associated with the industrial assets, and the generating comprises generating at least one of an executable industrial control program, an industrial visualization application, or industrial device configuration data; and
   in response to receipt of an edit to an automation object, of the automation objects, the shared library:
      determining, by the system, whether an instance of the automation object is included in the system project data,
      rendering, by the system via one or more of the IDE interfaces, a notification indicating that the automation object has been edited in the shared library, and
      in response to receipt, via interaction with one of the IDE interfaces, of a request to synchronize the edit, modifying, by the system, the instance of the automation object in accordance with the edit.

12. The method of claim 11, wherein the rendering of the notification comprises rendering at least one of an identity of the automation object to which the edit is directed, an attribute of the automation object that is modified by the edit, or an identity of the library in which the automation object resides.

13. The method of claim 11, wherein the rendering of the notification comprises rendering a graphical icon on or near a graphical representation of the instance of the automation object.

14. The method of claim 11, further comprising, in accordance with requests received via interaction with one or more of the IDE interfaces, synchronizing, by the system, the edit to a selected first subset of instances of the automation object less than a total set of instances of the automation object included in the system project data.

15. The method of claim 11, further comprising, in response to receipt of an instruction via interaction with one of the IDE interfaces, creating, by the system, a custom library of automation objects as a modified version of one of the shared libraries.

16. The method of claim 15, wherein the creating comprises setting, in accordance with the instruction, the custom library as one of a shared library accessible to other system projects or a personal library accessible exclusively to the system project.

17. A non-transitory computer-readable medium having stored thereon instructions that, in response to execution, cause a system comprising a processor to perform operations, the operations comprising:
   rendering integrated development environment (IDE) interfaces on a client device;
   receiving, from the client device via interaction with the IDE interfaces, design input that defines control design aspects of an industrial automation project;
   generating system project data based on the design input, wherein
      the generating comprises generating at least one of an executable industrial control program, an industrial visualization application, or industrial device configuration data, and
      the system project data comprises instances of automation objects selected from one or more shared libraries of automation objects, the automation objects representing respective industrial assets and having respective programmatic attributes relating to the industrial assets; and
   in response to receipt of an edit to an automation object, of the automation objects, in a library of the one or more shared libraries:
      determining whether an instance of the automation object is included in the system project data, and
      rendering, via one or more of the IDE interfaces, a notification indicating that the automation object has been edited in the library, and
      in response to receipt, via interaction with one of the IDE interfaces, of a request to synchronize the edit, modifying the instance of the automation object in accordance with the edit.

18. The non-transitory computer-readable medium of claim 17, wherein the rendering of the notification comprises rendering at least one of an identity of the automation object to which the edit is directed, an attribute of the automation object that is modified by the edit, or an identity of the library in which the automation object resides.

19. The non-transitory computer-readable medium of claim 17, wherein the rendering of the notification comprises rendering a graphical icon on or near a graphical representation of the instance of the automation object.

20. The non-transitory computer-readable medium of claim 17, wherein the operations further comprise, in accordance with requests received via interaction with one or more of the IDE interfaces, synchronizing the edit to a selected first subset of instances of the automation object less than a total set of instances of the automation object included in the system project data.

* * * * *